United States Patent [19]
Tsuji et al.

[11] Patent Number: 5,384,611
[45] Date of Patent: Jan. 24, 1995

[54] CAMERA SYSTEM CAPABLE OF WIRELESS FLASH PHOTOGRAPHING

[75] Inventors: Kenji Tsuji, Kashiwara; Akihiko Fujino, Sakai; Tsutomu Ichikawa, Hashimoto; Reiji Seki, Osaka; Hiroyuki Okada, Sakai, all of Japan

[73] Assignee: Minolta Camera Kabushiki Kaisha, Osaka, Japan

[21] Appl. No.: 885,644

[22] Filed: May 19, 1992

[30] Foreign Application Priority Data

| May 20, 1991 | [JP] | Japan | 3-145570 |
| May 20, 1991 | [JP] | Japan | 3-145571 |
| May 20, 1991 | [JP] | Japan | 3-145572 |
| May 20, 1991 | [JP] | Japan | 3-145573 |
| May 20, 1991 | [JP] | Japan | 3-145574 |
| May 20, 1991 | [JP] | Japan | 3-145575 |
| May 20, 1991 | [JP] | Japan | 3-145576 |
| May 20, 1991 | [JP] | Japan | 3-145577 |
| May 20, 1991 | [JP] | Japan | 3-145578 |

[51] Int. Cl.6 .............................................. G03B 15/03
[52] U.S. Cl. .................................. 354/131; 354/145.1; 354/413
[58] Field of Search ............ 354/129, 131, 132, 145.1, 354/149.1, 412, 413, 414, 415, 416, 417

[56] References Cited

U.S. PATENT DOCUMENTS

| 4,368,966 | 1/1983 | Hagyuda | 354/131 X |
| 4,512,644 | 4/1985 | Yoshida | 354/149.1 |
| 4,884,094 | 11/1989 | Kitaura et al. | 354/412 |
| 5,093,681 | 3/1992 | Matsuzaki et al. | 354/149.1 X |

FOREIGN PATENT DOCUMENTS

| 57-56830 | 4/1982 | Japan . |
| 57-56831 | 4/1982 | Japan . |
| 58-72931 | 5/1983 | Japan . |
| 1-254926 | 10/1989 | Japan . |
| 2-16897 | 4/1990 | Japan . |
| 2-264229 | 10/1990 | Japan . |
| 3-100633 | 4/1991 | Japan . |

Primary Examiner—Howard B. Blankenship
Attorney, Agent, or Firm—Willian Brinks Hofer Gilson & Lione

[57] ABSTRACT

A camera system capable of wireless flash photographing, comprising a camera and an external flash unit, wherein the external flash unit transmits a discriminating data such as a synchronized shutter speed with a wireless flash photographing, and the camera receives the discriminating data. According to the received data, a phototaking operation of the camera is executed.

21 Claims, 23 Drawing Sheets

CAMERA SYSTEM CAPABLE OF WIRELESS FLASH PHOTOGRAPHING

BACKGROUND OF THE INVENTION

The present invention relates to a camera system wherein an external flash is operated in accordance with wireless communication between a camera body and an external flash, and to a camera and a flash device which are employed for this system.

In the above-mentioned system, it is possible to control the operation of an external flash through some signal which is sent from the camera body. As for signals, it is known that an electric wave or a supersonic wave are utilized.

Also, in the above-mentioned system, known is the method making use of a flash light emitted from the camera body as the signals, to control the external flash operation in accordance with the signals. However, if the signal light is projected from a flash of the camera body during an external flash is flashing, the signal light from the camera can not be received at the external flash, because the signal light can not be discriminated from the light emitted from the external flash. Therefore, for example, it is difficult to stop flashing of the external flash by means of a flash light of the camera body.

As one of the methods in order to solve this problem, it is disclosed that the construction of a camera system which is arranged to carry out an intermittent flashing of the external flash so that a signal light from the camera can be caught during the external flash is not flashing, in the prior arts of Japanese Laid-Open Patent Publication No. 58-72931, No. 2-264229 and No. 1-254926.

However, in this kind of a camera system, as various kinds of external flashes are prepared, there are disadvantages as follows when they are used optionally.

Flashes differ each other in luminous characteristics in connection with capacity of its main capacitor, and in raising up feature and maximum flashing duration. Also, the flashes which emit light intermittently differ in the maximum flashing frequency. Accordingly in some cameras of the above-mentioned type, it is feared that the shutter operation does not synchronize with the flashing of an external flash even if the signal to start the flashing is output, and that the signal to stop the flashing of an external flash is output before the proper amount of flash light is attained.

Also, in a flash which emits light intermittently, a long time is needed to complete a flashing operation. Therefore it is impossible to attain proper exposure light, unless the shutter speed is adjusted in accordance with the time needed to complete the flashing operation.

SUMMARY OF THE INVENTION

It is an object of the present invention to provide a camera system, a camera and a flash which is able to control the wireless flash properly in a system using the wireless flash.

It is another object of the present invention to provide a camera system, a camera and a flash which is able to control the operation of the camera in accordance with a characteristic of the wireless flash.

According to the present invention, there is provided an improved camera system capable of wireless flash photographing comprising an external flash unit and a camera, wherein the flash unit includes transmit means for transmitting discriminating data to the camera, and the camera includes receiving means for receiving the discriminating data transmitted from the external flash unit.

More particularly, said external flash unit includes memory means for storing the discriminating data which indicates characteristic of the external flash, and said camera includes control means for controlling the operations of the camera in response to the received discriminating data.

Furthermore, in this system, said transmission by the transmit means is carried out when the external flash unit is attached to the camera.

BRIEF DESCRIPTION OF THE DRAWINGS

FIG. 18 is a flow chart corresponding to the time when the distance measuring switch S1 is turned on.

FIG. 20 is a flow chart corresponding to the time when the release switch S2 is turned on.

DETAILED DESCRIPTION OF THE EMBODIMENT

Figure 1:
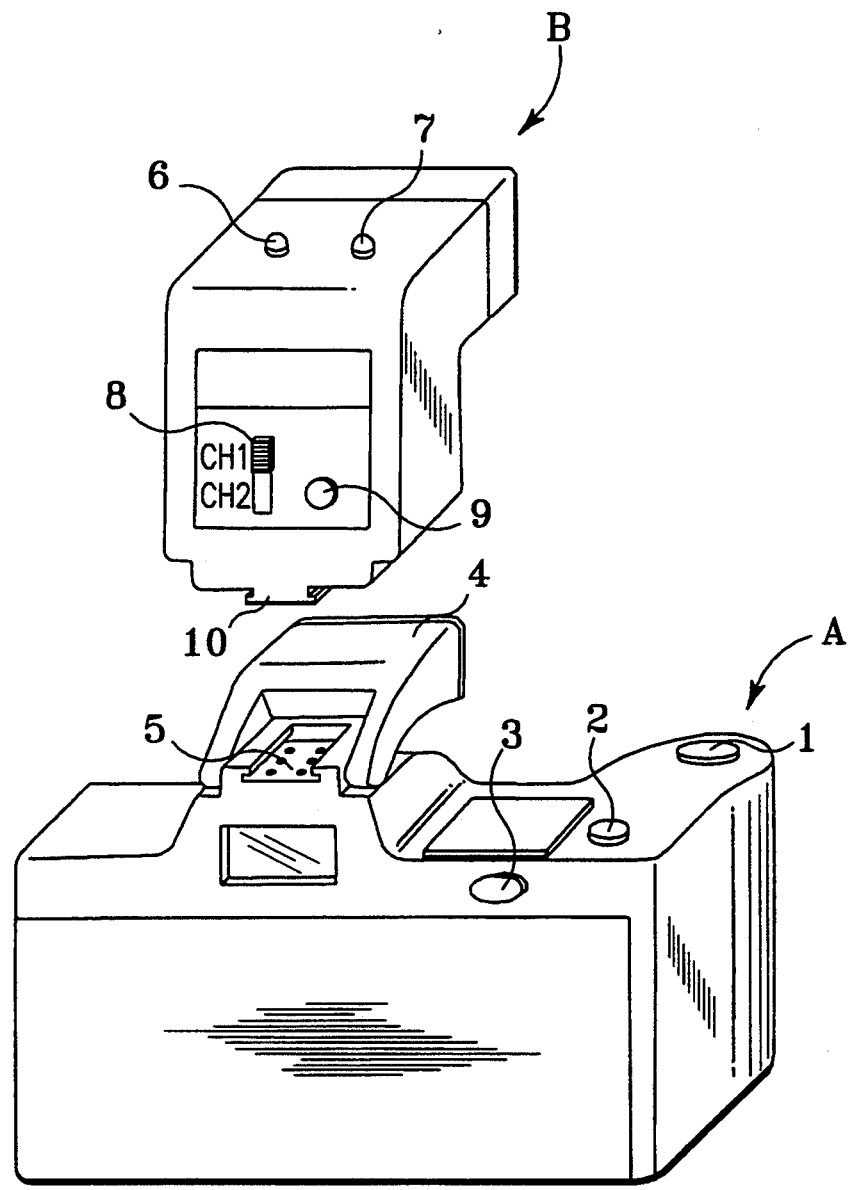
FIG. 1 is a rear perspective view of a camera with a wireless flash unit in accordance with the present invention.

FIG. 1 is a rear view of a camera A with a wireless flash B in accordance with the present invention. Reference is made to the camera A. The camera A has a release button 1, a mode selection button 2, a test flashing button 3, and a built-in flash unit 4. The release button 1 is to carry. out measurement of the brightness of a subject, measurement of distance to the subject (or focus detection), and focusing operation when it is pressed by half step. An exposure operation is also carried out when the release button 1 is fully pressed down. The mode selection button 2 is to select between a normal flash mode and a wireless flash mode. The test flashing button 3 is to output a signal for carrying out a test flashing of the wireless flash unit B in the wireless flash mode, and is located at right side of a pentagonal roof prism of the camera A so as to enable to carry out a test flashing when an operator supports the camera A with right hand and the wireless flash unit B with left hand.

The built-in flash unit 4 is pivotally mounted upward of the pentagonal prism and provided a pop-up position where the flashing section is set apart from the axis of the taking lens and a retractive position where the flashing section is retracted. The built-in flash unit 4 can operate only when it is in the pop-up position. When judged a flashing operation is needed because of low brightness, if the flash unit 4 is in the retractive position, the flash unit 4 is automatically popped up. The flash unit can be also set back from the pop-up position to the retractive position by being pressed down. The flash unit 4 is used when the brightness of the subject is low and used as a control signal source when photographing with the wireless flash unit B. The camera has a connector 5 to which an external wireless flash unit B can be mounted to communicate with the wireless flash unit B via six terminals as described hereinafter.

In a camera having an AE locking function or in a camera having a SPOT light measuring function for measuring light only at the center of the phototaking field, there are sometimes the cases that the AE locking button and the SPOT light measuring button are located at right side of the pentagonal section in the same manner as described the test flashing button 3. In such cases, it is possible to make the above-mentioned buttons to concurrently serve as the test flashing button 3.

Nextly, reference is made to the wireless flash unit B (referred to as "the flash unit B" hereinafter). A mode display section 6 displays the current condition of the normal flash mode or the wireless flash mode, while a charge completion display section 7 displays completion of an electric charging operation of the capacitor for the flash unit B. The display sections 6 and 7 are projecting above the flash unit B so that they can be seen from in front of the flash unit B. A channel selecting section 8 is the switch section for changing wireless signal in the wireless flash mode for avoiding interference with another wireless flash unit. A mode selection button 9 selects between the normal flash mode and the wireless flash mode. A connector 10 provided on the flash unit B can be mounted to the connector 5 of the camera. The connector 10 has a shoe switch (not shown) to detect that the flash unit B is mounted to the camera A. In the above case, the built-in flash unit 4 is made to retract into the camera A, therefore, when photographing with the flash unit B mounted to the camera A, the built-in flash unit 4 and the flash unit B never flash simultaneously.

Figure 2:
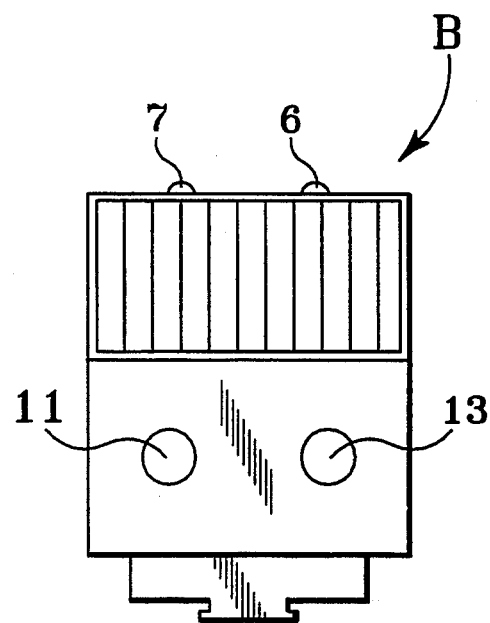
FIG. 2 is a front view of the wireless flash unit in FIG. 1.
Figure 5:
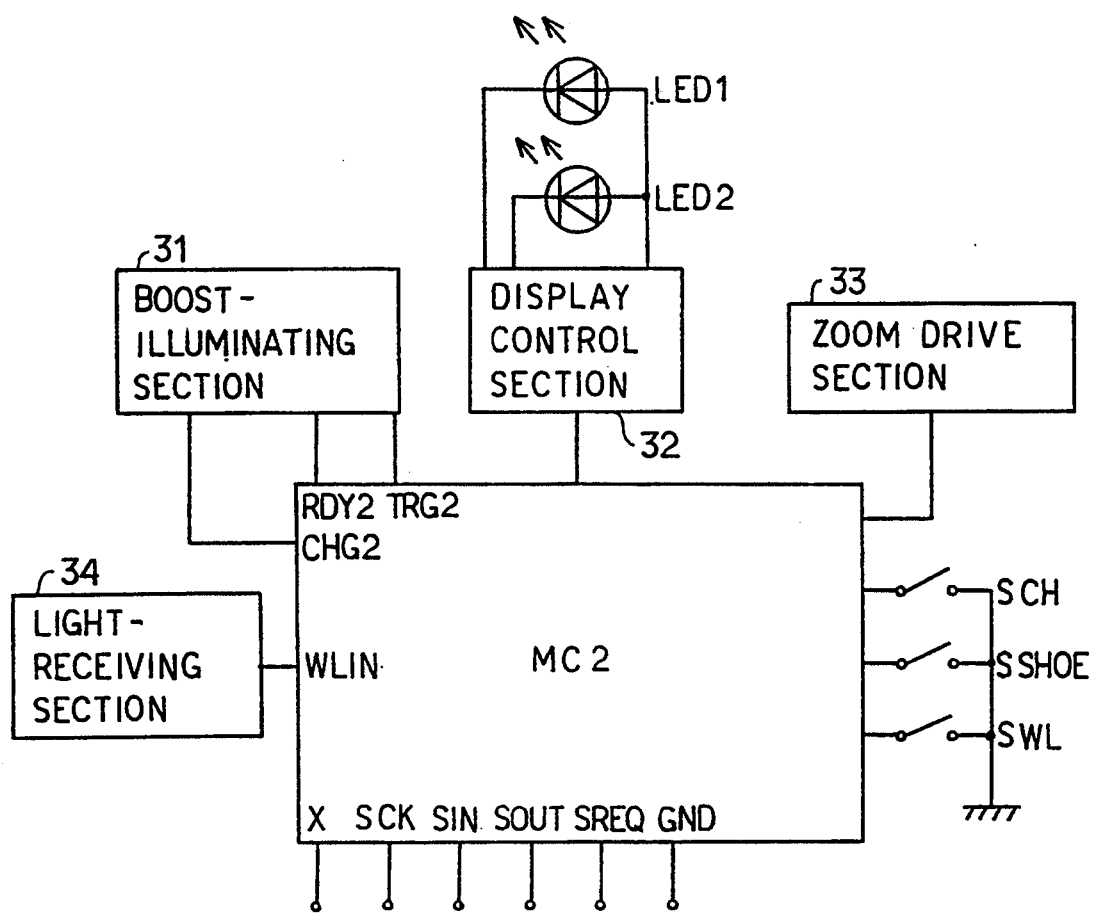
FIG. 5 is a block chart of the internal structure of the wireless flash unit in FIG. 1.

FIG. 2 is a front view of the flash unit B in accordance with the present invention, where a light-receiving window 11 is to receive a wireless signal light from the camera A in the wireless flash mode and includes a light-receiving section 34 which is shown in FIG. 5 described in detail hereinafter. Projecting above the flash unit B are the aforesaid mode display section 6 and charge completion display section 7. An auto-focus auxiliary light projecting window 13, when the flash unit B is mounted to the camera A, is to project a predetermined pattern-light on the subject, if the focus detection is impossible because of low contrast, low brightness etc.

Figure 3:
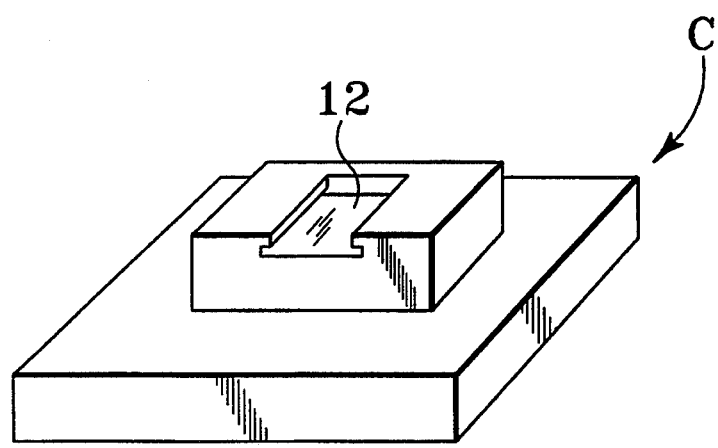
FIG. 3 is a perspective view of a mounting base of the wireless flash unit in FIG. 1.

FIG. 3 shows a perspective view of a mounting base C for the flash unit B in accordance with the present invention. Provided upward of the mounting base C is a recess portion 12 having the same configuration as the connector 5 of the camera to enable receiving the flash unit B. In the wireless flash mode, by mounting the flash unit B to the mounting base C, the flash unit B can be used as placed on something. In the bottom of the mounting base C or the flash unit B may be formed a tripodal hole for receiving a tripod screw.

Figure 4:
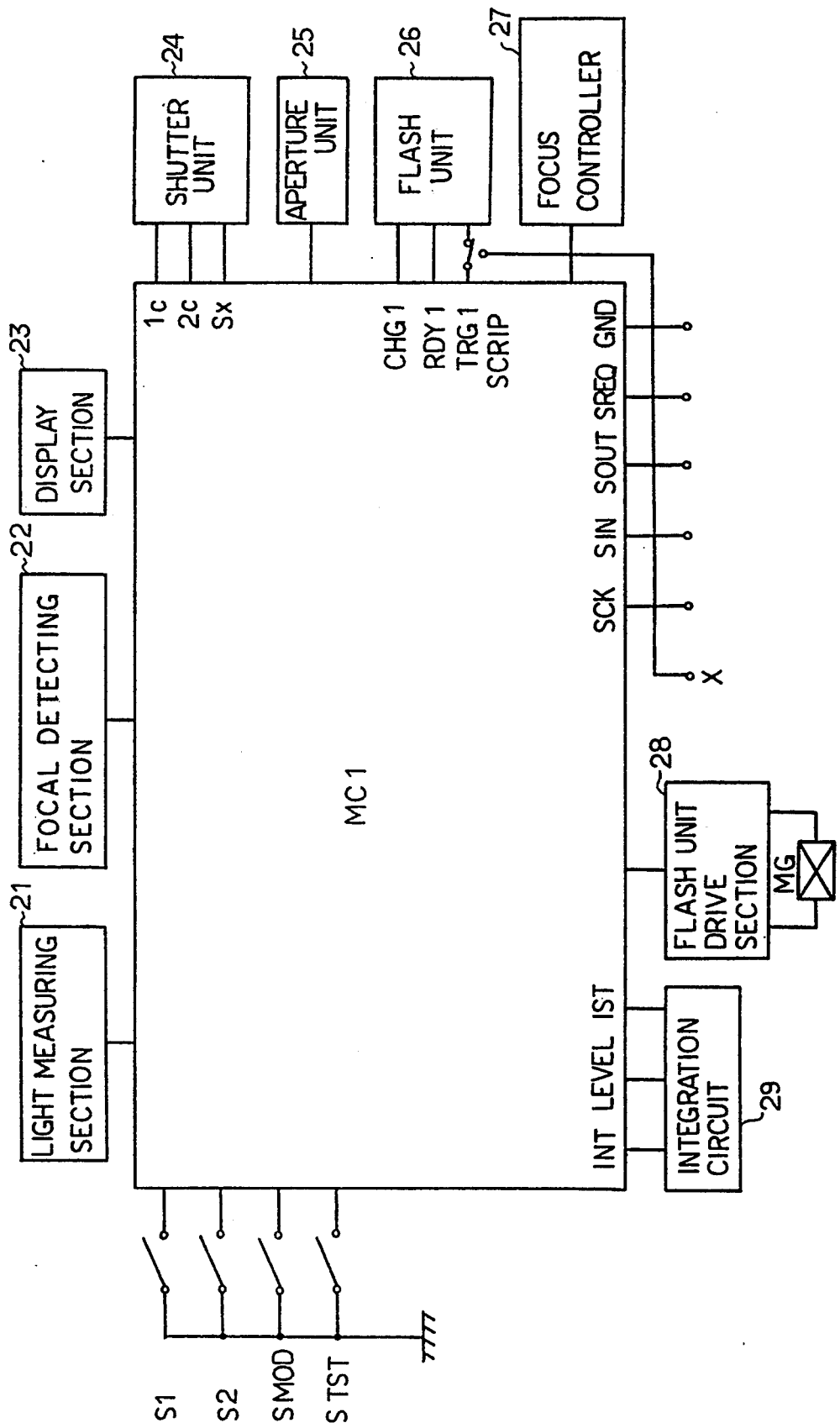
FIG. 4 is a block chart of the internal structure of the camera in FIG. 1.

FIG. 4 is a block diagram of the camera A in accordance with the present invention. A microcomputer MC1 carries out sequence control, calculation for exposure, etc. A light measuring section 21 is for measuring the brightness of the subject. A focal detecting section 22 is for detecting the focal condition. A display section 23 comprises LCD, LED, etc. for displaying the amount of film for photographing, shutter speed, aperture,photographing mode, etc. A shutter unit 24 comprises a focal plane shutter whose operation is controlled by the microcomputer MC1 according to a first curtain starting signal for run from a terminal 1C and a second curtain starting signal for run from a terminal 2C. When the first curtain run is completed, a first curtain run completion signal (SX="L") is output from a terminal SX. An aperture unit 25 controls the aperture diameter according to a signal from the microcomputer MC1.

A flash unit 26 comprises a booster circuit, a capacitor for flashing (referred to as "the main capacitor" hereinafter), a discharge tube, etc. and corresponds to the built-in flash 4 as shown in FIG. 1. Used in the flash unit 26 is an IGBT inserted in a discharge loop circuit consisting of the discharge tube to enable controlling the time of flashing, the flash unit 26 is connected via a clip switch SCRP to the microcomputer MC1. When the clip switch SCRP is connected to the flash unit 26, a flashing is carried out during the signal status at a terminal TRG1 is "L". The clip switch SCRP is to be connected to the flash unit 26 when the built-in flash 4 is in the retractive position, and connected to a terminal X as described hereinafter when the built-in flash 4 is in the pop-up position. At a terminal RDY1 is output a voltage obtained by dividing the voltage of the main capacitor by reslstors. The microcomputer MC1 converts the voltage at the terminal RDY1 to an analog-to-digital to thereby detect the charge condition of the main capacitor. A terminal CHG1 is to control boosting of the booster, and when the signal status at the terminal CHG1 is "L", a boosting operation is carried out.

A focus controller 27 drives a phototaking lens for focus according to a control signal from the microcomputer MC1. A driving section for a flash unit 28 is for making the built-in flash 4 pop up, and to which section 28 is connected a solenoid MG which is turned on according to a signal from the microcomputer MC1. The built-in flash unit 4 is biased to a direction to be popped up and engaged with the camera in the retractive position. By turning on the solenoid MG without mounting the flash unit B to the camera A, the built-in flash unit 4 is made to pop up.

An integration circuit 29 operates when the signal status at a terminal IST is made to be "L", and outputs a signal in status "L" to a terminal INT when the integration amount of flash light reflected on the subject reaches a predetermined amount. The predetermined light amount is set up according to a signal from a terminal LEVEL of the microcomputer MC1. Therefore, when photographing with flashing, the exposure amount of flash light can be controlled finely in steps of "appropriate", "1-step under", and "1-step over" by varying the predetermined light amount. The exposure amount of flash light is normally set at the position of "appropriate".

A light and distance measuring switch S1 is turned on by pressing the release button 1 by half step, while the microcomputer MC1 carries out light measurement and distance calculation in the light measuring section 21 and focal detecting section 22, to carry out calculation for exposure, focus lens drive, etc. A release switch S2 is turned on by fully pressing the release button 1 to start an exposure operation. A mode selection switch SMOD is turned on by pressing the mode selection button 2, and each time it is turned on, changeover between the normal flash mode and the wireless flash mode is done.

A test flashing switch STST is turned on by pressing a test flashing button 3 as shown in FIG. 1. By turning on the test flashing switch STST in the wireless flash mode, the microcomputer MC1 outputs a signal for carrying out a test flashing of the flash unit B to a flash unit 26. Terminals X, SCK, SIN, SOUT, SREQ, and GND are for communication with the flash unit B regarding the charge condition of the main capacitor of the flash unit B, start of flashing, stop timing, etc. when the flash unit B is mounted to the camera A, and those terminals are connected to the flash unit B via the connector 5. The terminal GND is for grounding, while a terminal X is for controlling the discharge time of the discharge tube of the flash unit B in the normal flash mode.

When the flash unit B is mounted to the camera A, the terminal TRG1 is connected to the terminal X. During the signal status at the terminal TRG1 is "L", the discharge tube is made to discharge. The terminals SCK, SIN, SOUT are for serial communication, while the terminal SREQ is for requiring communication with the flash unit B. When communicating with the flash unit B, firstly the signal status at the terminal SREQ is made to be "L", and after a specified time, a serial clock signal is output from the terminal SCK and input to the terminal SIN. When it is judged that a specified data is input and the flash unit B is mounted, a communication with the flash unit B is carried out.

FIG. 5 is a block chart of the flash unit B in accordance with the present invention. The flash unit B is subject to a sequence control by means of a microcomputer MC2. The boost-illuminating section 31 is a block for boosting the main capacitor of the flash unit B and discharging the discharge tube as having the same construction as the flash unit 26 of the camera as mentioned hereinbefore. Boosting control is carried out by CHG2, monitoring charging of the main capacitor by RDY2, and illuminating time control is by TRG2. A display control section 32 is to control the mode display section 6 and charge completion display section 7 as shown in FIG. 1 and the section 32 is connected to an LED1 and an LED2 which are controlled to turn on and off by means of a signal from the microcomputer MC2. The LED1 constitutes the charge completion display section 7, while the LED2 constitutes the mode display section 6. Switching patterns of the LEDs are described in detail hereinafter.

A zoom drive section 33 is a block for varying the distance between a reflector of the flash unit B and the flash panel in response to the focal length of the phototaking lens to change the light distribution of the flash unit B. A light-receiving section 34 is a block for receiving a wireless signal light from the camera A. When receiving a signal light, the signal status at the terminal WLIN is made to be "L", while a channel selection switch SCH is turned on and off by sliding the slide switch of the channel selecting section 8. When the switch SCH is on, the channel "1" is selected. When the switch SCH is off, the channel "2" is selected. A shoe switch SSHOE is turned on when the flash unit B is mounted to the camera A. A mode selection switch SWL is turned on when the mode selection button 9 of the flash unit is pressed, and every time the switch SWL is pressed, changeover between the normal flash mode and the wireless flash mode is done.

Terminals SCK, SIN, SOUT, SREQ, and GND are connected to the correspondin9 terminals named same of the camera A as shown in FIG. 4 when the flash unit B is mounted to the camera A. By way of the above-mentioned terminals, information of charge condition of the main capacitor, channel information, focal length information of the phototaking lens, etc. are communicated with the camera A. A terminal X is to control the illuminating time of the discharge tube as described hereinbefore, and when the signal status at the terminal X is "L", the microcomputer MC2 maintains the signal status at the terminal TRG2 at "L". The terminals SCK, SIN, and SOUT are for serial communication, while the terminal SREQ is for requiring a serial communication. When the signal status at the terminal SREQ is made to be "L" by the microcomputer MC1, the microcomputer MC2 sets up a variety of information in the register for serial communication. In synchronization with a clock pulse input from the terminal SCK, a serial communication is carried out. The corresponding terminals of the camera A and the flash unit B are named same, while the microcomputer MC2 outputs a serial signal to the terminal SIN and receives a serial signal from the terminal SOUT.

Figure 6:
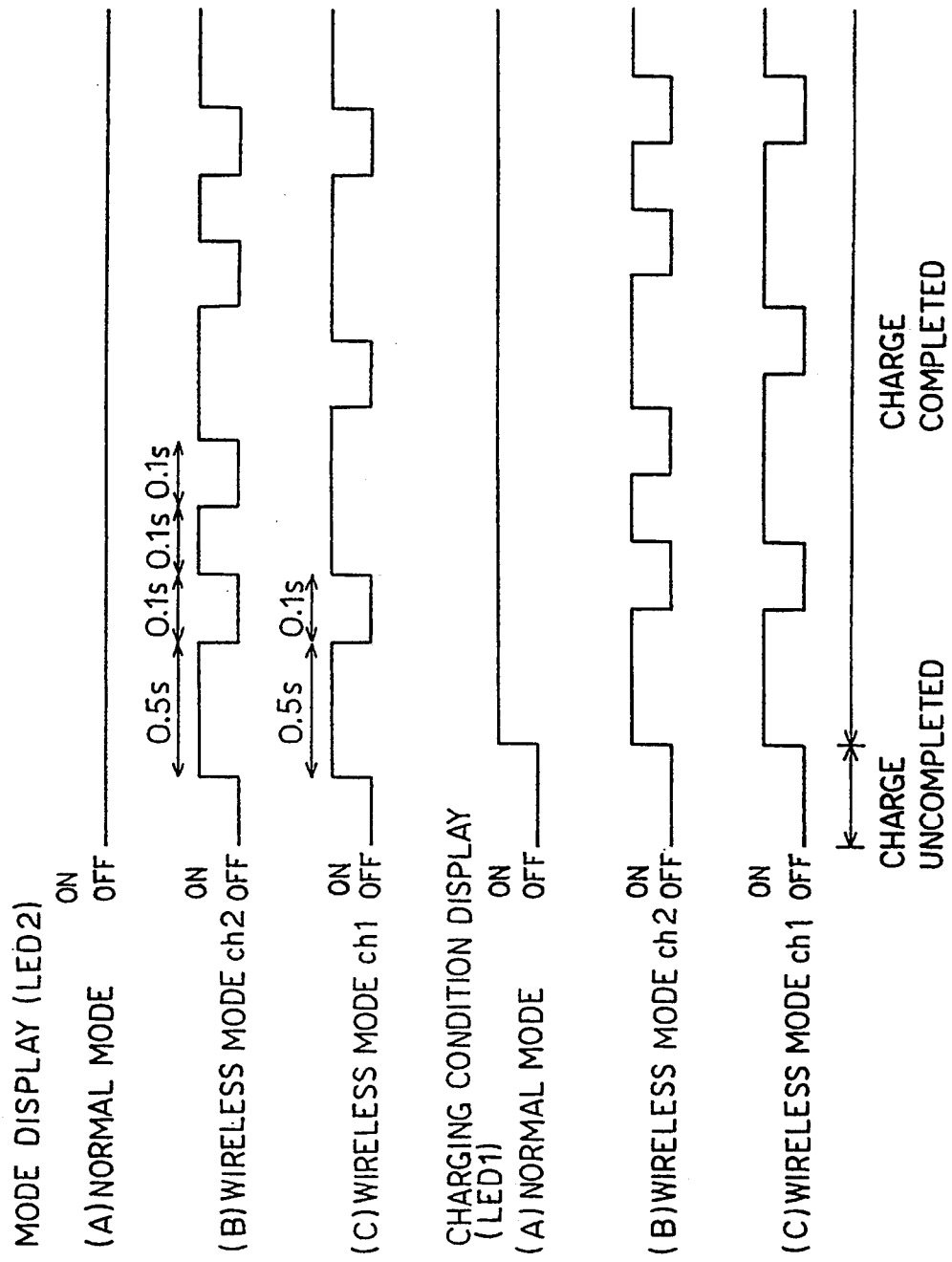
FIG. 6 shows the lighting pattern of a display section of the wireless flash unit.

FIG. 6 shows lighting patterns of the LED1 and the LED2 of the display control section 32. The LED2 is lit under control in specified lighting patterns as shown in FIG. 6 according to the selected mode. While the LED1 is lit when charging is completed. It is noted that the LED1 is controlled in the form of being superimposed on the lighting pattern representative of each mode. It is also possible to emit auto-focus auxiliary light instead of LED1.

Figure 7:
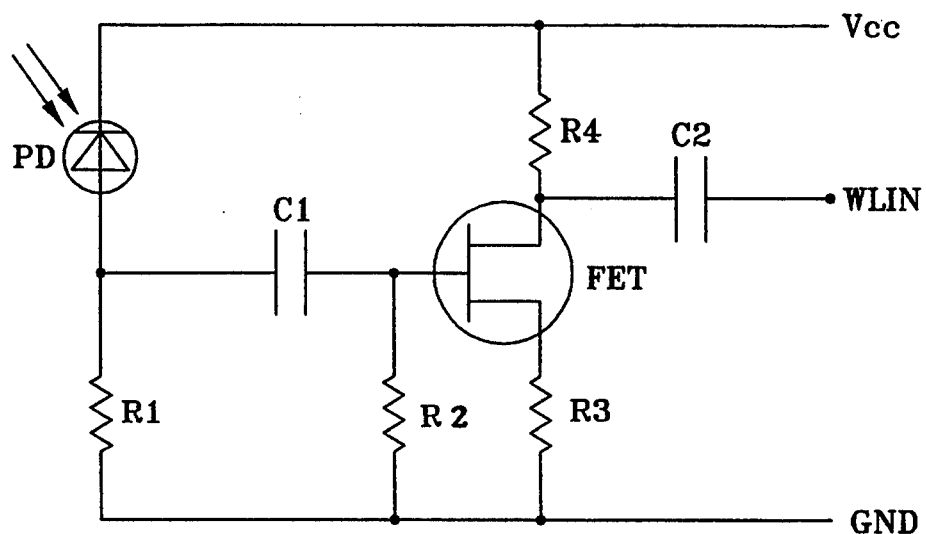
FIG. 7 is a circuit diagram of a light-receiving section of the wireless flash unit.

FIG. 7 is a circuit diagram of the light receiving section 34 as described hereinbefore. When a light is input into a photodiode PD, an electric current corresponding to the light flows therefrom. The current is converted into a voltage by means of a resistor R1. Then the available light component is eliminated by means of a differential circuit consisting of a capacitor C1 and a resistor R2 and only the signal light component is input to the gate of an FET. Therefore, the light receiving section 34 inputs a signal in status "L" via a terminal WLIN to the microcomputer 2 only when receiving the signal light.

Figure 8:
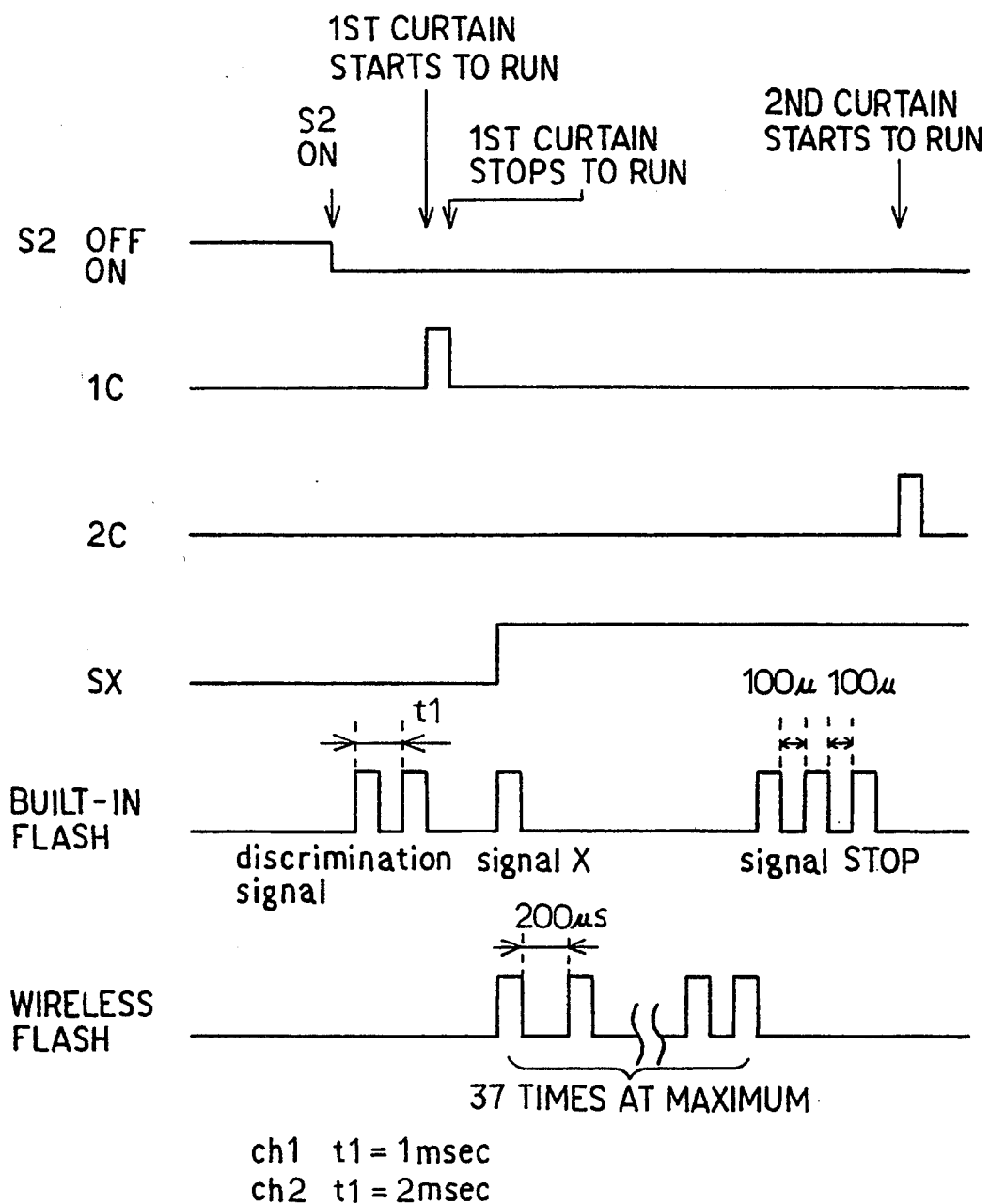
FIG. 8 is a timing chart of the operations in the wireless flash mode of the present embodiment.

FIG. 8 is a timing chart representing the operation in the wireless flash mode in accordance with the present invention. When the release switch S2 is turned on in the wireless flash mode, a discrimination signal light is output from the built-in flash unit 4 of the camera A. The present embodiment is so designed that two signals having an interval of 1 millisecond are output when the channel 1 is selected, and two signals having an interval of 2 milliseconds are output when the channel 2 is selected. The first curtain of the shutter starts to run, and upon completion of the first curtain run, a signal X is output to designate start flashing the flash unit B. When the flash unit B confirms that the above-mentioned discrimination signal belongs to the setup channel, the flash unit B starts flashing for a specified time at a specified interval according to the signal X. The camera A subjects the currents, corresponding to the reflected light on the subject formed from the built-in flash 4 and the flash unit B subsequent to the signal X, to an integration in the integration circuit 29 provided inside the camera A, and when the integration voltage reaches a specified voltage, the camera A outputs a signal STOP to stop the flashing operation of the flash unit B. In response to input of the signal STOP, the flash unit B stops flashing. After the elapse of a specified time, the camera A makes the second curtain start to run and to end the exposure operation. The above-mentioned sequence of operations are described in more detail hereinafter.

The frequency and duration of the flashing operation of the flash unit B are as follows when the flash unit B starts flashing upon input of the signal X and carries out an intermittent flashing.

| Flashing frequency | 1–4 | 5,6 | 7,8 | 9–36 | 37 |
|---|---|---|---|---|---|
| Flashing duration (microseconds) | 30 | 50 | 70 | 100 | 500 |

The flashing frequency-flashing duration data are stored in a memory of the microcomputer MC2. Flashing duration is made longer at every specified frequency. Flashing is done 37 times at maximum where the interval between each flashing is 200 microseconds. The flashing frequency is the frequency permitting no more flashing in the condition that charging of the main capacitor is completed and the intermittent flashing is done at the above-mentioned timing, the frequency depending on the capacity of the main capacitor. Although the flashing duration is increased in steps in the present embodiment, the amount of steps may be increased and the flashing duration may be increased every time of flashing.

Figure 9:
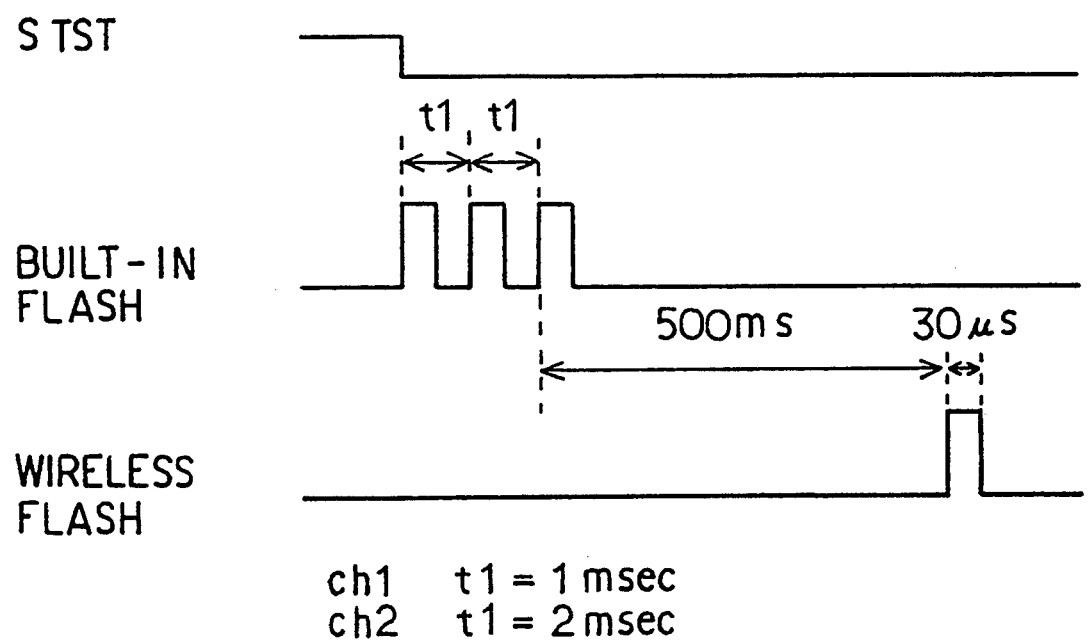
FIG. 9 is a timing chart in the test flashing mode of the present embodiment.

The following describes the test flashing function in the wireless flash mode with reference to FIG. 9. The function is to check before an actual photographing, whether the signal light is correctly transmitted or received, whether the setup channel is correct, and whether charging of the wireless flash has been completed, which function being shown in the form of a timing chart in FIG. 9. By turning on the test flashing button 3 in the wireless flash mode, a signal different from the aforesaid discrimination signal is transmitted. In the present embodiment, three signals having therebetween intervals of 1 millisecond are transmitted when the channel 1 is selected, or three signals having therebetween intervals of 2 milliseconds are transmitted when the channel 2 is selected. The microcomputer MC2 in the flash unit B receives a discrimination signal, and when it confirms that the received signal is a signal for test flashing of the setup channel, a flashing is carried out after delay of 500 milliseconds.

Figure 10:
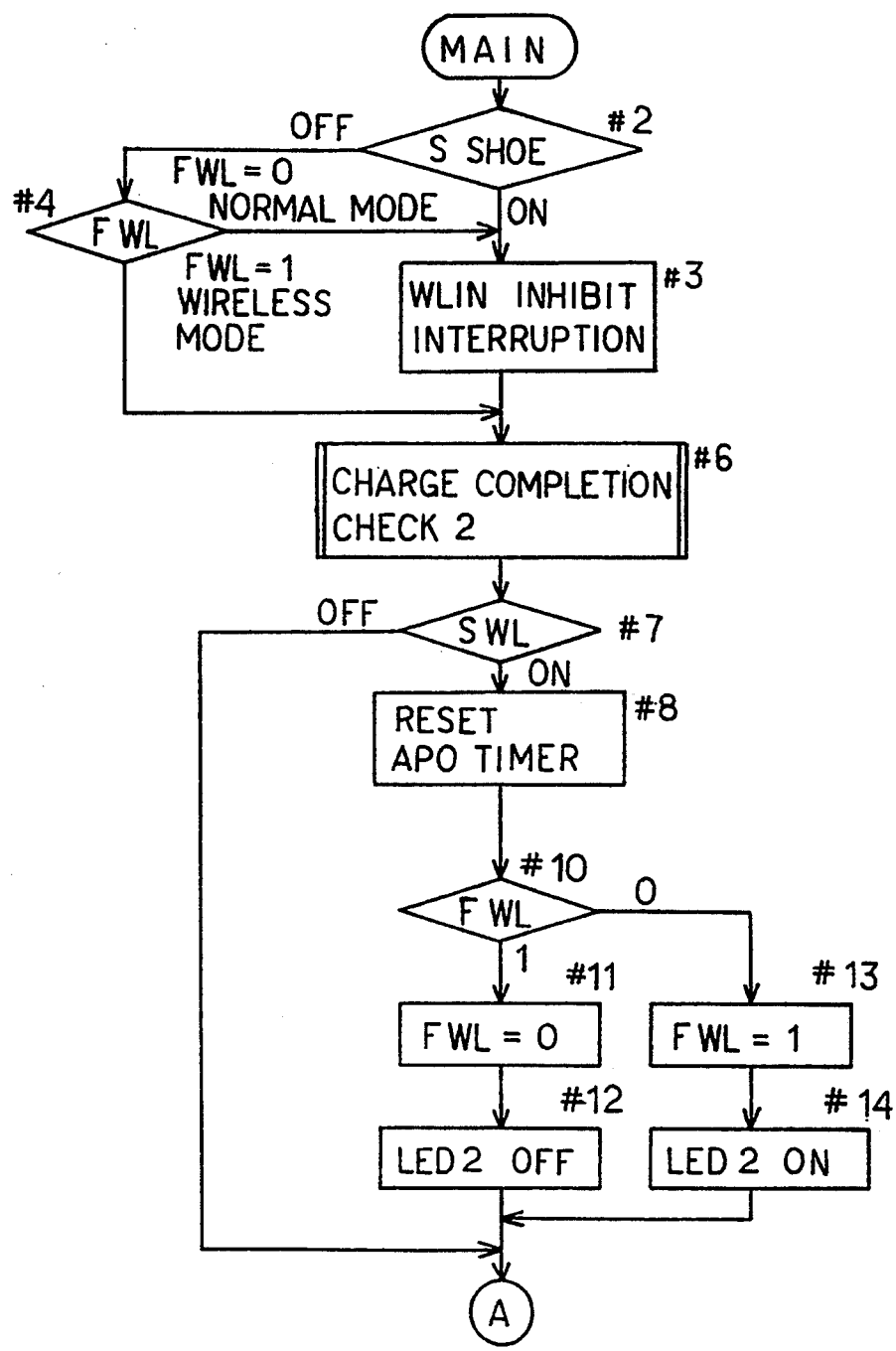
FIG. 10 is a flow chart of the operations of the camera.
Figure 11:
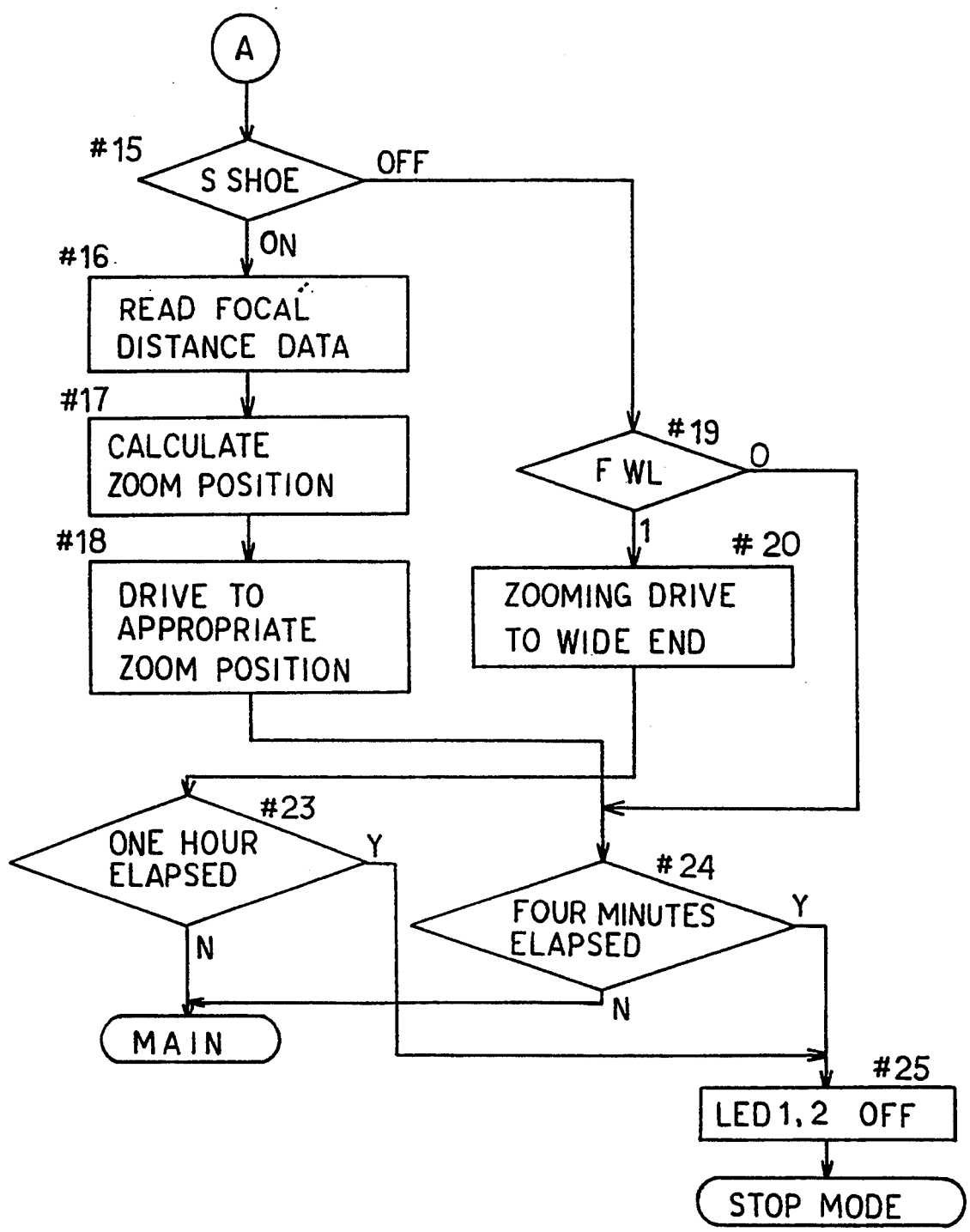
FIG. 11 is a flow chart of the operations of the camera.

The following describes the operation of a camera system in accordance with the present invention with reference to flow charts in FIG. 10 and subsequent figures. First of all, reference is made to the operation of the wireless flash unit. When inserting a battery into the flash unit B, the microcomputer MC2 starts its operation according to a "MAIN" flow chart as shown in FIGS. 10 and 11. Firstly, it is judged whether the flash unit B is mounted to the camera A by means of the shoe switch SSHOE #2). When the shoe switch SSHOE is on, i.e., when the flash unit B is mounted to the camera A, any possible interruption from the terminal WLIN of the light receiving section 34 for receiving a wireless signal is inhibited (#3), and the processing proceeds to step #6. When the shoe switch SSHOE is off, i.e., when the flash unit B is not mounted to the camera A, a mode flag FWL is judged (#4). The mode flag FWL is a flag for discriminating the flash mode, and the flag is "1" in the wireless flash mode or "0" in the normal flash mode. When FWL=1, i.e., when the wireless flash mode is selected at step #4, the processing proceeds to step #6. When FWL=0, i.e., when the wireless flash mode is not selected, the processing proceeds to step #3. At step #6, a subroutine of "charge completion check 2" as described hereinafter is carried out. In the present subroutine, the voltage across the main capacitor is checked, and when the voltage is lower than a specified voltage, a charging operation of the capacitor is carried out.

After completing the "charge completion check 2", the mode selection switch SWL is checked (#7). When the mode selection switch SWL is on, an APO timer is reset and then started (#8), and the processing proceeds to step #10. In the above case, the APO means the function of automatic power off which effects to reduce the current consumption by automatically turning off the power when no command for switch or flash operation takes place for more than a specified time. At step #10, discrimination of the flash mode is carried out by means of a mode flag FWL. When FWL=1, FWL is made to be FWL=0 (#11), and a command for turning off the LED2 is transmitted to the display control section 32 (#12), and the processing proceeds to step #15. When FWL=0, FWL is made to be FWL=1 (#13), and a command for turning on the LED2 is transmitted to the aforesaid display control section 32 (#14), and the processing proceeds to step #15. In the above-mentioned cases, lighting of the LED2 is controlled as shown in FIG. 6 according to the selected wireless mode. When the mode selection switch SWL is off at step #7, the processing proceeds to step #15 without executing the above-mentioned operations. With the above-mentioned operations, changeover between the normal flash mode and the wireless flash mode takes place every time turning on the mode selection switch SWL.

At step #15, it is Judged whether the flash unit B is mounted to the camera A by means of the shoe switch (#15). When the shoe switch is on, i.e., when the flash unit B is mounted, focal length data of the phototaking lens of the camera A is read from the memory (#16) to therewith calculate such a zoom position of the flash unit that the light distribution characteristic of the flash unit is made appropriate for the angle of field corresponding to the focal length (#17). After driving the flash unit to the appropriate zoom position (#18), the processing proceeds to step #24. When the shoe switch is off at step #15, i.e., when the flash unit is not mounted, mode discrimination is carried out by means of the mode flag FWL (#19). When FWL=1, i.e., when the wireless flash mode is selected, the zoom flash is driven to the wide end position thereof to broaden the light distribution of the flash unit (#20), and the processing proceeds to step #23.

At step #23, it is confirmed that one hour has already elapsed by means of the APO timer. When one hour has not yet elapsed, the processing returns to "MAIN" to repeat the above-mentioned operations. When one hour has already elapsed, the processing proceeds to step #25. When FWL=0, i.e., when the normal flash mode is selected at step #19, and the processing proceed to step #24, it is judged whether four minutes has elapsed. When four minutes has not yet elapsed, the processing returns to "MAIN". When four minutes has elapsed, the processing proceeds to step #25, and a command for turning off the LED1 and LED2 is transmitted to the display control section 32, while the microcomputer MC2 enters into the "STOP mode". In the "STOP mode", the microcomputer MC2 turns off the power of each block of the flash unit, and the microcomputer stops its clock generation to reduce current consumption as far as possible. Returning from the "STOP mode" is done when a change in condition of the above-mentioned switch units or a requirement for serial communication from the camera A takes place. At the returning time, the processing starts from the aforesaid process "MAIN".

Figure 12:
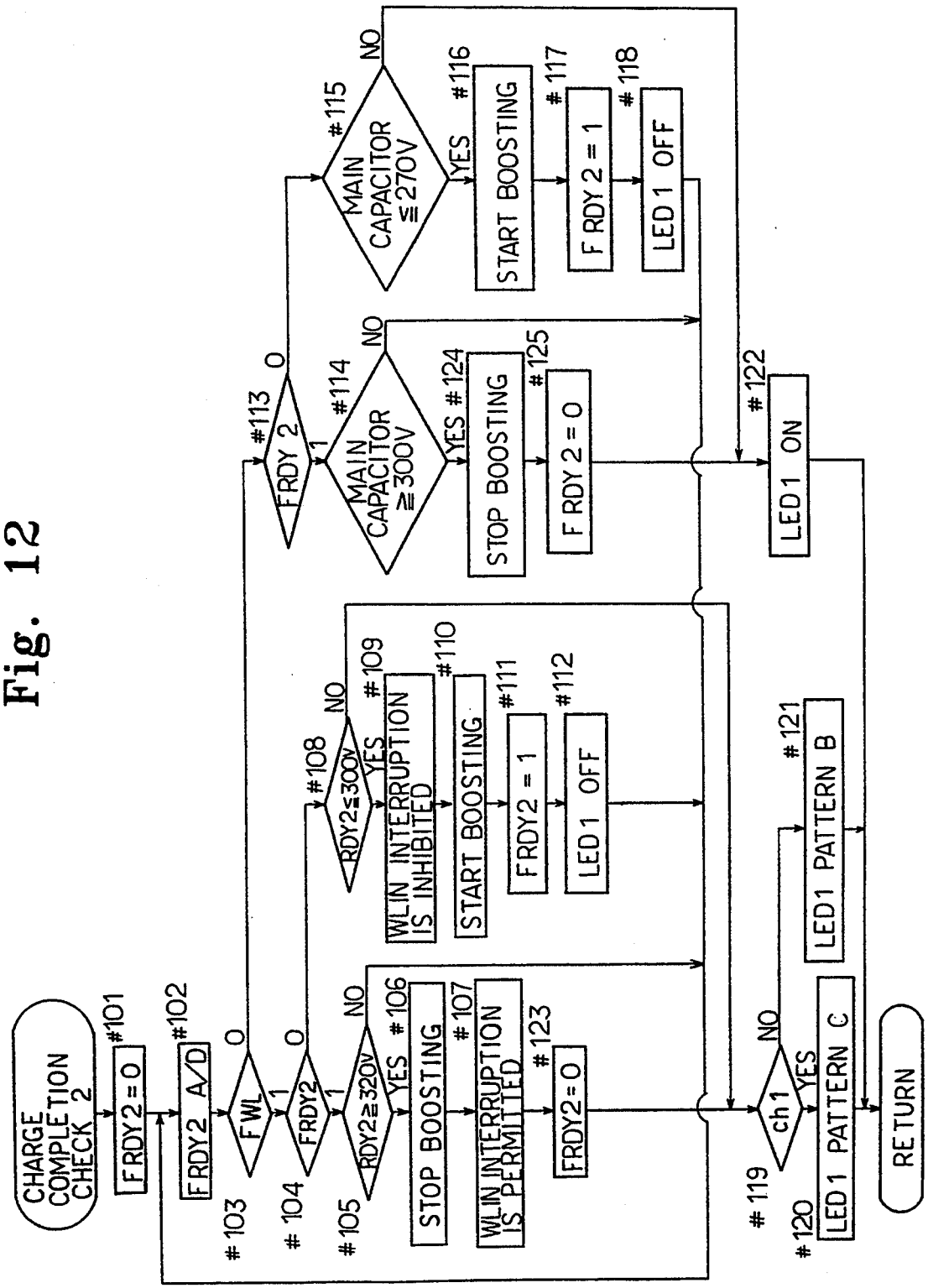
FIG. 12 is a flow chart of a subroutine of "charge completion check 2" of the operations of the camera.

The following describes the processing of the aforesaid subroutine "charge completion check 2" with reference to FIG. 12. Firstly, a charge completion flag FRDY2 is reset to "0" (#101). The charge completion flag FRDY2 is to discriminate whether the main capacitor is now being charged, and the flag is "1" in charging or "0" not in charging. Then the voltage at the terminal RDY2 is connected to an analog-to-digital to detect the charge voltage of the main capacitor (#102), then the flash mode is checked (#103). When FWL=1, i.e., when the wireless flash mode is selected, it is judged whether charging is now being carried out by means of the charge flag FRDY2 (#104). When in charging, it is then judged whether the voltage across the main capacitor is not lower than 320 volt from the result of analog-to-digital conversion of RDY2 (#105). When the voltage has reached 320 volt, the boosting operation is stopped (#106), while an interruption from the terminal WLIN is permitted (#107). Then the charge flag FRDY2 is reset to "0" (#123), and the processing proceeds to step #119. When the voltage across the main capacitor has not reached 320 volt, the processing returns to step #102. When no charging is carried out at step #104, the processing proceeds to step #108 to discriminate whether the voltage across the main capacitor is not higher than 300 volt. When the voltage across the main capacitor is not higher than 300 volt, any possible interruption from the terminal WLIN is inhibited (#109). Then a boosting operation starts (#110), and the charge flag FRDY2 is set to "1" (#111). Then a command of turning off the LED1 is transmitted to the display control section 32 (#112), and then the processing returns to step #102.

When FWL=0, i.e., when the wireless flash mode is not selected, the processing proceeds to step #113. Regarding the processing subsequent to step #113, the same operation as that in the above-mentioned wireless mode is carried out except that the control of permitting or inhibiting interruption from the terminal WLIN is different and that the voltage across the main capacitor is changed from the range of 320 volt to 300 volt into the range of 300 volt to 270 volt, therefore, no detailed description is provided herein. As described above, the voltage across the main capacitor is maintained at 300 volt to 320 volt in the wireless flash mode, or maintained at 270 volt to 300 volt in the normal flash mode, which means that the voltage across the main capacitor in the wireless flash mode is higher and voltage fluctuation is more suppressed as compared with the corresponding voltage in the normal flash mode. At step #119, it is judged whether the channel selection switch SCH is in "1" or "2" position. When the channel 1 is selected, such a command that the lighting pattern of the LED1 corresponds to the pattern C in FIG. 6 is transmitted to the display control section 32 (#120), or a command such that the lighting pattern of the LED1 corresponds to the pattern B in FIG. 6 is transmitted to the display control section 32 (#121) when the channel 2 is selected, and then the processing returns. When the processing proceeds to step #122, a command for turning on the LED1 is transmitted to the display control section 32, and the processing returns.

Figure 13:
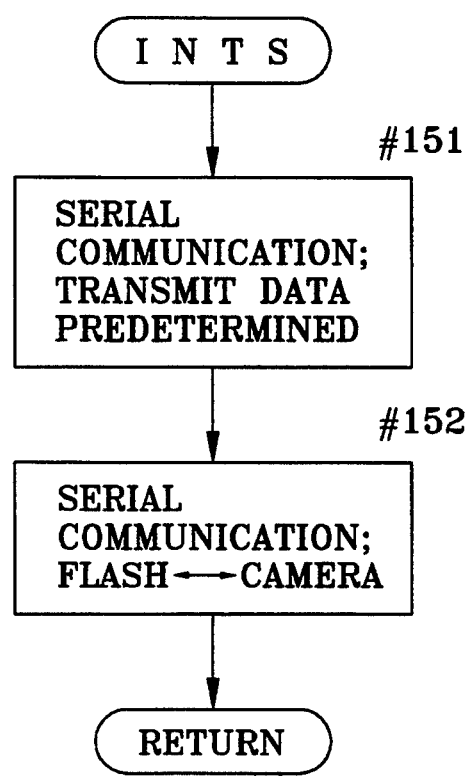
FIG. 13 is a flow chart of a communication between the camera and the flash unit.

The following describes how communication is carried out when the flash unit B is mounted to the camera A with reference to FIG. 13. When the signal status at the aforesaid terminal SREQ is "L", an interruption takes place in the microcomputer MC2, and an interruption processing routine starts from "INTS". The microcomputer MC2 transmits data predetermined with the microcomputer MC1 at the terminal SIN in synchronization with the serial clock signal output at the terminal SCK of the microcomputer MC1 built in the camera A (#151) to communicate with the camera A regarding a variety of data (#152), and then the processing returns.

In the above-mentioned communication, for example, focal length data of the phototaking lens, flash mode, phototaking mode, test flashing, etc. are transmitted from the camera A to the flash unit B, while charge condition data of the main capacitor, flash mode, selected channel, synchronized shutter speed, etc. are transmitted from the flash unit B to the camera A. The reason why the synchronized shutter speed is transmitted is that, when a wireless flash other than that of the present embodiment is used, the permitted frequency of intermittent flashing differs depending on the capacity of the main capacitor, and therefore the total time from the start of intermittent flashing to the end of the same differs when flashing is carried out totally of the permitted frequency. By subsequently transmitting the flash mode data of the camera A to the flash unit B when the latter is mounted to the former, the flash mode of the flash unit B becomes as same as that set in the camera A.

Although the flash mode set up in the camera A has a priority in the present embodiment, the priority may be also given to the flash unit B to transmit the flash mode data of the flash unit B to the camera A. By means of a flash mode communication, the flash mode can be set up either in the camera A or the flash unit B.

In the camera A, the wireless flash mode channel is set up according to the above-mentioned channel data from the flash unit B. Although the flash mode channel setting of the camera A is carried out by mounting the flash unit B to the camera A in the present embodiment, an independent channel setting switch may be provided on the camera A to enable channel setting singly by the camera A.

Figure 14:
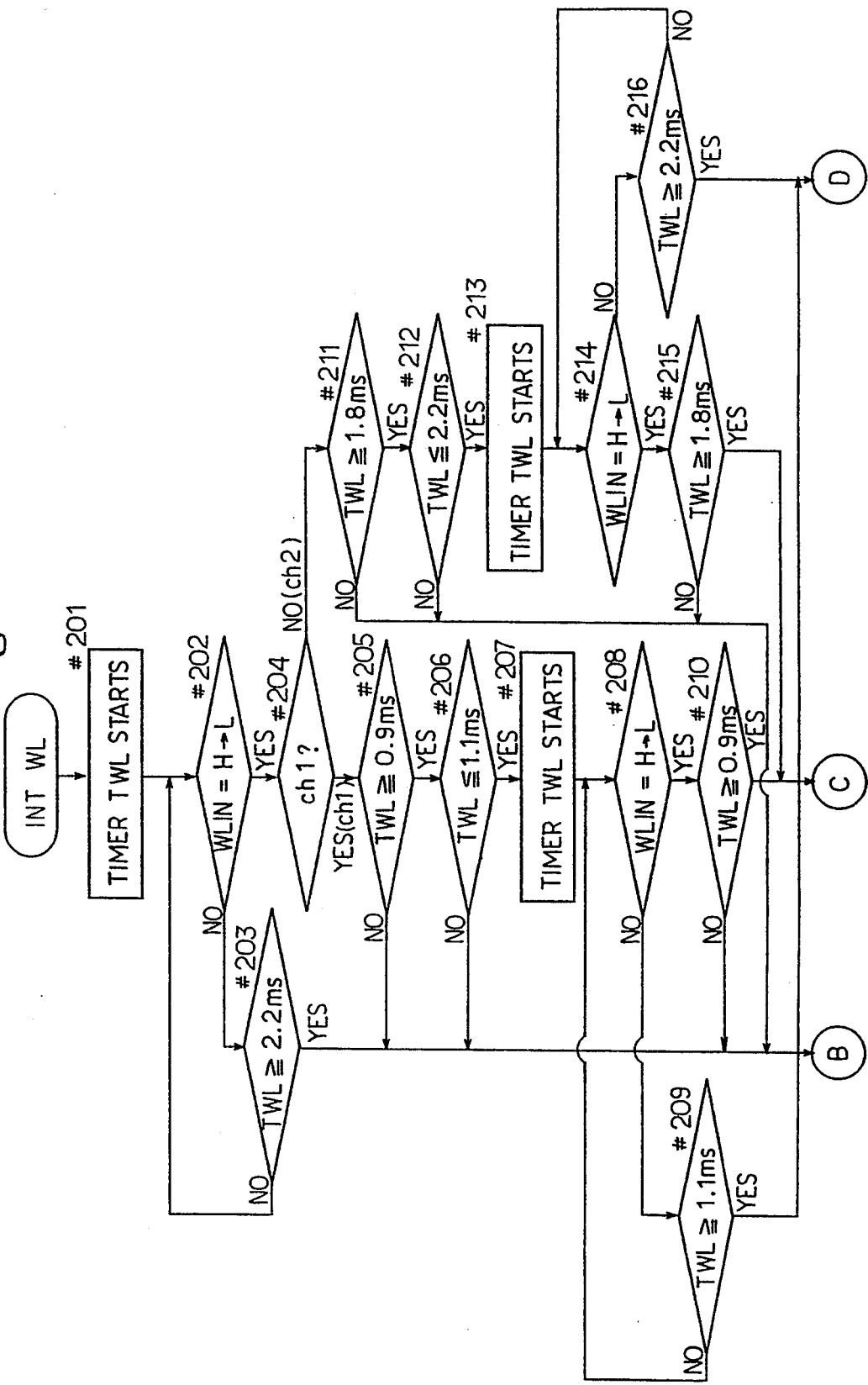
FIG. 14 is a flow chart of an interruption processing routine "INTWL" in the wireless flash unit.
Figure 15:
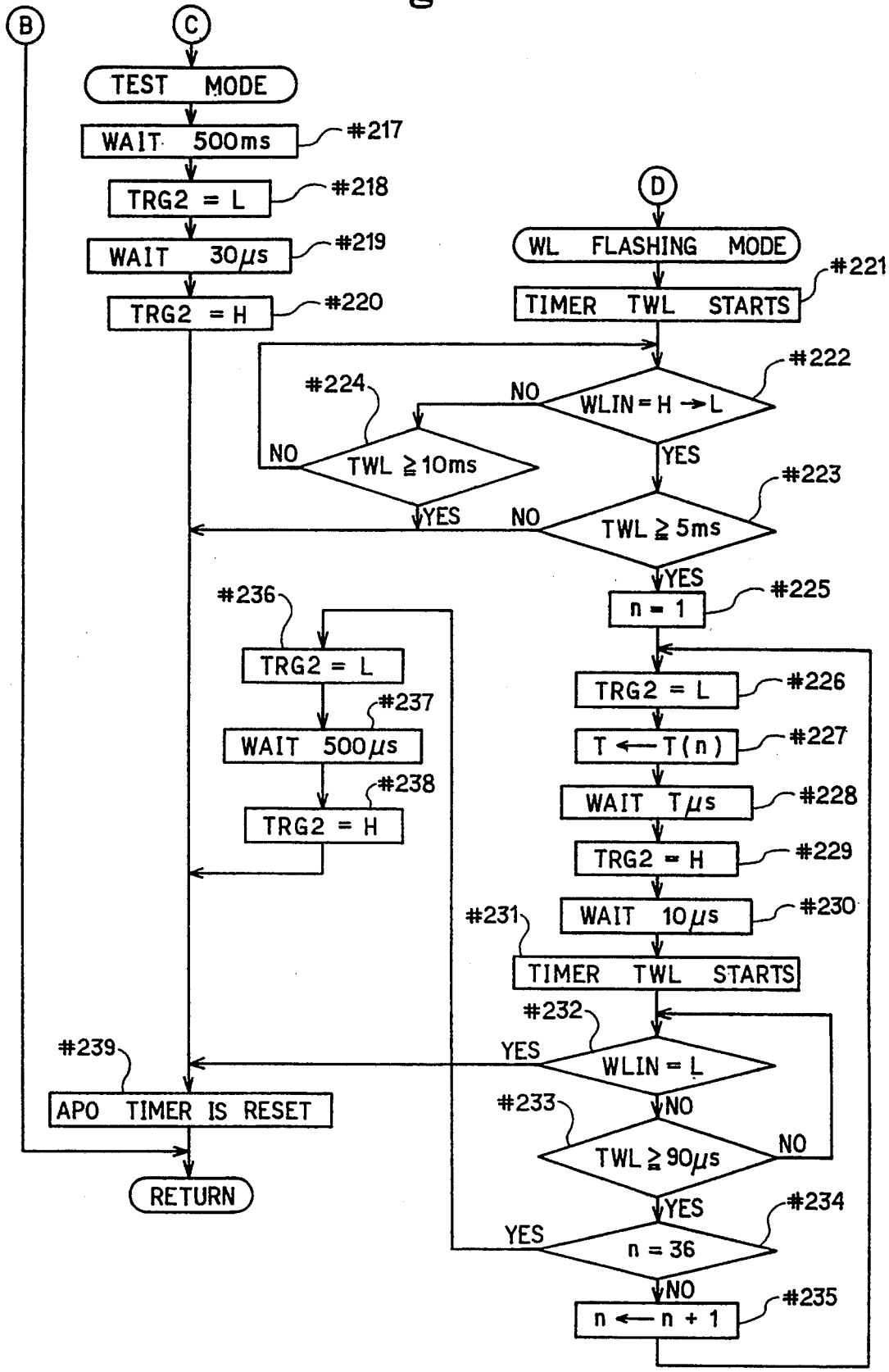
FIG. 15 is a flow chart of the interruption processing routine "INTWL" in the wireless flash unit.

The following describes the interruption process routine from the terminal WLIN with reference to FIGS. 14 and 15. In the wireless flash mode, when receiving a wireless signal from the built-in flash unit 4 of the camera and a signal of WLIN="L" from the light-receiving section 34, the microcomputer MC2 starts processing from "INTWL" for signal discrimination and judges whether the next signal is input. Firstly, a timer TWL starts (#201). The operation speed of the microcomputer MC2 is rapid enough, therefore, the timer TWL starts approximately simultaneously with the change of the signal status at WLIN from "H" to "L". Then a maximum of 2.2 milliseconds waits for the change of the signal status at WLIN from "H" to "L" (second signal reception) (#202 and #203). When the signal status at WLIN does not change for not shorter than 2.2 milliseconds, the above-mentioned first signal can be assumed to be noise, and therefore the processing returns.

When the signal status at WLIN changes from "H" to "L", it is judged whether the channel set up in the flash unit B is "1" or "2" (#204). When the channel 1 is set up, it is judged whether the timer TWL indicates 0.9 to 1.1 milliseconds (#205 and #206). With the above operation it can be checked whether the interval between the first and second signals is 0.9 to 1.1 milliseconds. If the above-mentioned condition is not satisfied, the two signals are assumed to be noise and the processing returns. If the condition is satisfied, it can be confirmed that the two signals are surely the discrimination signals. Then the timer TW starts (#207), and it is judged whether the next signal input takes place before the elapse of 0.9 to 1.1. milliseconds. In other words, the timer waits for the change of signal status at WLIN from "H" to "L" for a maximum of 1.1 milliseconds (#208 and #209). When the signal status at WLIN does not change from "H" to "L" before the elapse of 1.1 milliseconds, it is found that the amount of the signals having an interval of 1 millisecond therebetween are two, i.e., it is discriminated that the signals represent the wireless mode of the channel 1, and the processing proceeds to "WL flashing mode" at step #221 and subsequent steps. When the signal status at WLIN changes before the elapse of 1.1. milliseconds, the processing proceeds to step #210 to judge whether 0.9 millisecond has elapsed. When a time not shorter than 0.9 millisecond has not elapsed, the signals are assumed to be noise, and the processing returns. When a time not shorter than 0.9 millisecond has elapsed, it is found that three signals having therebetween intervals of 1 millisecond has been input, therefore, it is discriminated that the signals represent the test mode of the channel 1, and the processing proceeds to "test mode" at step #217 and subsequent steps.

When the channel 2 is set up, the processing proceeds from step #204 to step #211, and at steps #211 through #216 the same processing as described above is carried out except for the setup time of the timer. In this case, it is checked whether the interval between the first signal and the second signal was 1.8 to 2.2 milliseconds, and it is also checked whether the next signal input takes place before the elapse of 1.8 to 2.2 milliseconds. When only two signals are input, it is discriminated that the signals represent the wireless mode of the channel 2. When three signals are input, it is discriminated that the signals represent the test mode of the channel 2.

In the test mode, after waiting for 500 milliseconds (#217), the signal status at TRG2 is made to be "L" for 30 microseconds to carry out a test flashing operation (#218, #219, and #220), after which the APO timer is reset (#239) and the processing returns. In the "WL flashing mode", the timer TWL is restarts (#221), and the signal status at WLIN changes from "H" to "L", i.e., the timer waits for signal X for a maximum of 10 milliseconds (#222 and #224). When the signal status at WLIN does not change from "H" to "L", the processing proceeds to step #239, and the processing returns. When a change takes place within 10 milliseconds, it is judged whether a time of not shorter than 5 milliseconds has elapsed (#223). When a time not shorter than 5 milliseconds has not elapsed, the processing returns. In other words, when the signal status at WLIN does not change from "H" to "L" within the range of 5 to 10 milliseconds after the start of timer TWL at step #221, the processing returns.

The reason of adopting the above-mentioned time arrangement is as follows. The camera A in accordance with the present jnvention has an operation such that, when photographing in the wireless flash mode, the first curtain is made to run immediately after the discrimination signal is output and immediately after the first curtain run the signal X for commanding start of flashing is output. There may be also a certain variance in time from the start of the first curtain run to the completion of the same as well as a certain error in the clocked operation of the microcomputers MC1 and MC2 depending on an environmental change such as temperature change. Either of the time arrangement of not shorter than 5 milliseconds or the time arrangement of not longer than 10 milliseconds includes a certain margin tolerant of errors so long as the shutter and the microcomputers operate normally. It is noted that the time margins depend on the capabilities of the shutter and the microcomputers and therefore the time margins are not limited to the above ranges. The arrangement of giving a certain time margin (+10%) to the time of judging the discrimination signals has the same reason as above.

When the signal status at WLIN changes from "H" to "L" in the above-mentioned time, the processing proceeds to step #225 to set the counter value n to 1 and thereafter proceeds to step #226. The counter is to count the frequency of intermittent flashing of the flash unit B. Subsequently the signal status at the terminal TRG2 is made to be "L" (#226), and a flashing operation is carried out based on the relationship between the flashing frequency and the flashing duration (in the table provided hereinbefore) (#227, #228, and #229). After waiting for a maximum of 10 microseconds (#230), the timer TWL starts (#231) to wait for the change of the signal status at the terminal WLIN to "L", i.e., the output of a STOP signal from the camera A for a maximum of 90 microseconds (#232 and #233). When the signal status at the terminal WLIN becomes "L" before the elapse of 90 microseconds, the processing proceeds to the step #239, and after resetting and starting the APO timer, the processing returns. Therefore, no more flashing takes place.

When the signal status at the terminal WLIN does not change to "L" within 90 microseconds in the above condition, the processing proceeds to step #234 to judge whether 36 times of flashing has been carried out referring to the count value n (#234). When 36 times of flashing has not been carried out, the counter value n is changed to n+1 (#235), and the processing returns to step #226 to repeat the operations as described above. When it is confirmed that 36 times of flashing has been completed, the processing proceeds to step #236 to carry out the last flashing operation at the 37th time for 500 microseconds (#237). Subsequently the APO timer is set and started, and the processing returns. Due to the flashing continuing 500 microseconds, almost all the electric charge in the main capacitor are discharged.

Figure 16:
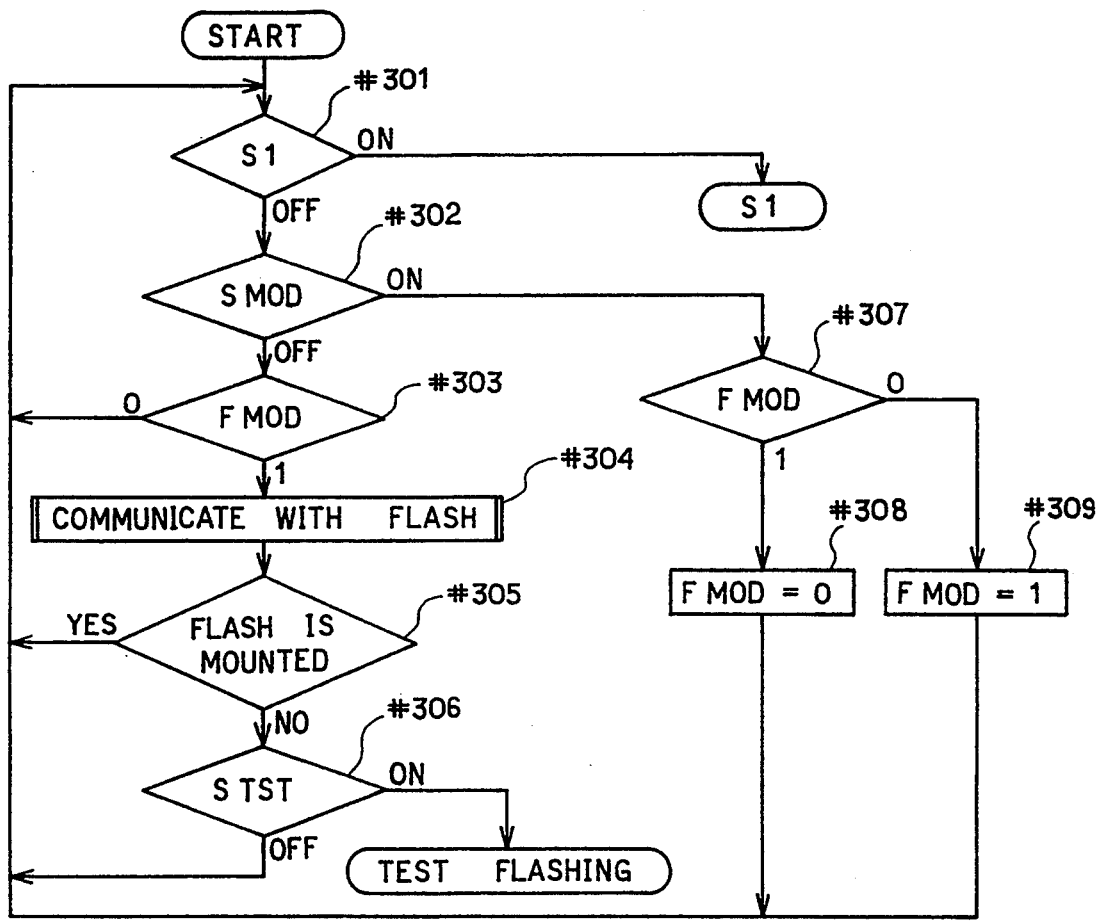
FIG. 16 is a flow chart of the operations of the camera.

Then reference is made to the operations of the camera A. When a battery is inserted in the camera A, the microcomputer MC1 starts its operation from "START" in FIG. 16. Firstly it is judged whether the light-distance measuring switch S1 is on or off (#301). When the switch is on, the processing proceeds to "S1" as described hereinafter. When the switch is off, it is judged whether the mode selection switch SMOD is on or off (#302). When the switch SMOD is on, the processing proceeds to step #307 to discriminate the mode flag FMOD. It is noted in the above case that the mode flag FMOD is a flag for discriminating whether the camera A is in the normal flash mode or in the wireless flash mode. The flag is "0" in the normal flash mode or "1" in the wireless flash mode. When the flag FMOD=1 at step #307, it is changed to FMOD=0 (#308). When the flag FMOD=0, it is changed to FMOD=1 (#309), and the processing returns to step #301. In other words, every time turning on the mode selection switch SMOD, a change can take place between the normal flash mode and the wireless flash mode.

When the mode selection switch SMOD is off at step #302, the processing proceeds to step #303 to discriminate the mode flag FMOD. When the flag represents the normal flash mode (FMOD=0), the processing returns to step #301. When the flag represents the wireless flash mode (FMOD=1), the processing proceeds to step #304 to communicate with the flash unit B in a manner as described hereinafter. Then the processing proceeds to step #305 to judge whether the flash unit B is mounted. When the flash unit B is mounted, the processing returns to step #301. When the flash unit B is not mounted, it is judged whether the test flashing button switch STST is on or off (#306). When the switch STST is off, the processing returns to step #301. When the switch STST is on, the processing proceeds to a test flashing operation as described hereinafter. Although not provided in the present flow chart, the camera A also has the same automatic power off function as that of the flash unit B. When the operation switch is left untouched for more than a specified time, the microcomputer MC1 cuts off the power to each block and stops its clock generation to keep a stop condition until any operation switch is operated.

Figure 17:
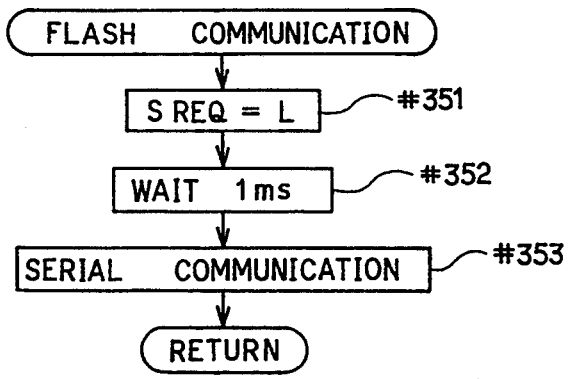
FIG. 17 is a flow chart of the subroutine of "flash communication" of the operations of the camera.

Then reference is made to the processing "flash communication" with reference to FIG. 17. Firstly the signal status at a terminal SREQ is made to be "L" in order to transmit a command for serial communication to the flash unit B (#351), and an interruption is made in the microcomputer MC2 built in the flash unit B. After waiting for 1 millisecond (#352), a serial communication is carried out (#353). In the above case, the microcomputer MC1 built in the camera A outputs a clock for the serial communication at the terminal SCK. When a specified signal is not input from the terminal SIN, the microcomputer MC1 determines that the flash unit B is not mounted to thereby stop communication. When a specified data is input from the terminal SIN, a subsequent communication is made according to a specified format. When a communication corresponding to a specified bit amount is completed, the processing returns.

Figure 18:
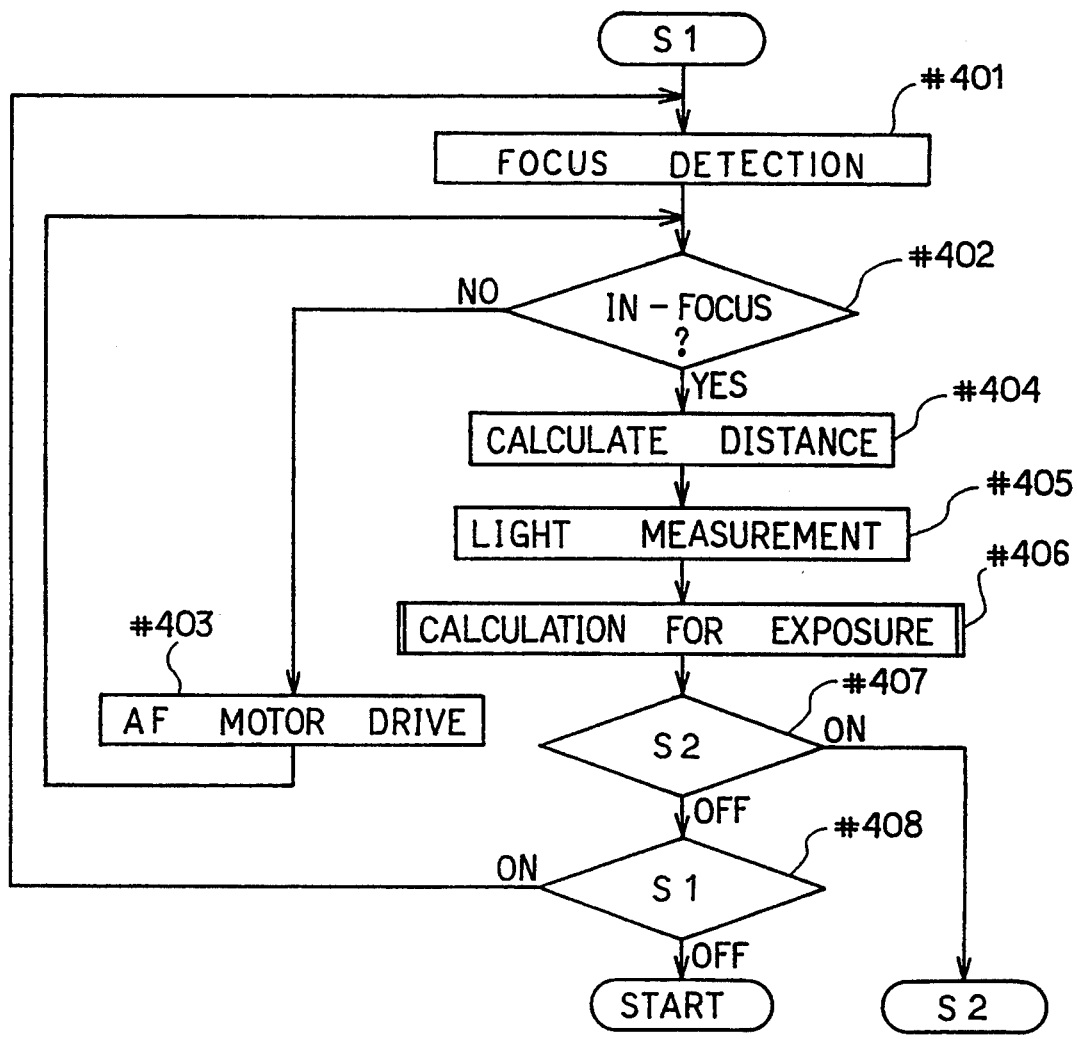

Then reference is made to the aforesaid switch S1 with reference to a flow chart in FIG. 18. Firstly focus detection is carried out in the focal detecting section 22 (#401) to judge whether focus is in or not (#402). When focus is not in, the phototaking lens is driven to an infocus position by means of an AF motor not shown (#403), and the processing returns to step #402. When focus is in, the distance between the camera and the object is calculated from the lens position (#404), and the brightness of the object is measured by the light measuring section 21 (#405). Then a calculation for exposure as described hereinafter is carried out based on the information of the distance to the object, brightness of the object, flash mode, etc. (#408), and the processing proceeds to step #407. At step #407, it is judged whether the release switch S2 is on or off. When the switch S2 is on, the processing proceeds to the routine "S2" as described hereinafter. When the switch S2 is off, it is judged whether the light and distance measuring switch S1 is on or off (#408). When the switch S1 is on, the processing returns to step #401. When the switch S1 is off, the processing proceeds to "START" as described hereinafter. In the above, focus detection system is employed, but directly distance measuring system may be also employed.

Figure 19:
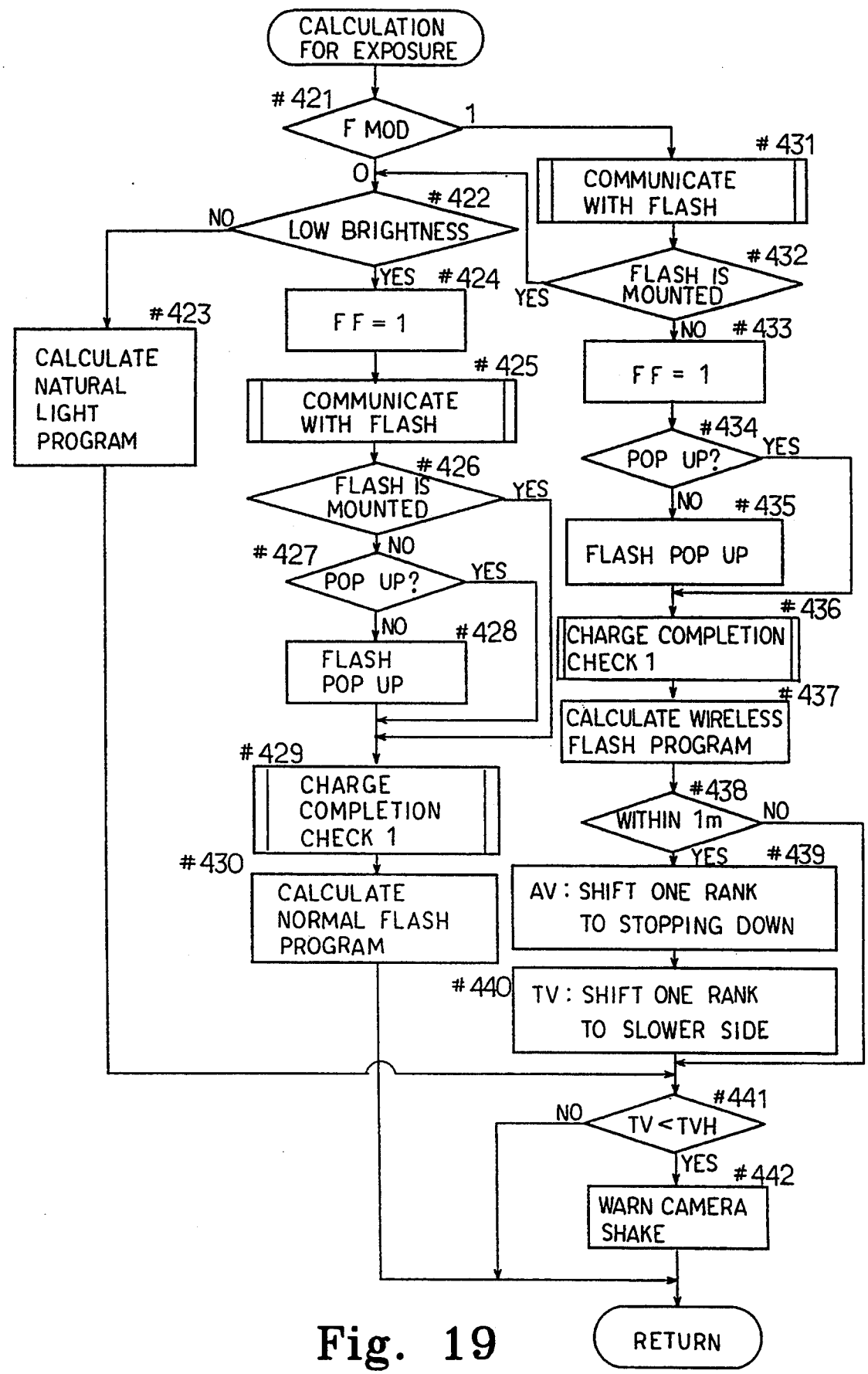
FIG. 19 is a flow chart of the operations of "calculation for exposure".

Then reference is made to the processing of "calculation for exposure" with reference to FIG. 19. Firstly discrimination of the flash mode is carried out based on the mode flag FMOD (#421). When the flag represents the normal flash mode (FMOD=0), it is judged whether the brightness of the object is lower than a specified brightness (#422). When the brightness of the subject is not lower, a shutter speed TV and a aperture AV are obtained from the program line for photographing under available light (not shown) (#423), and the processing proceeds to step #441 as described hereinafter. When the brightness of the object is lower, after changing a flash flag FF to "1" (#424), a "flash communication" as described hereinbefore is carried out (#425), and the processing proceeds to step #426. It is noted that the flash flag FF is a flag for judging whether a flash is to be used at the time of exposure, where use of a flash corresponds to "1" and disuse of a flash corresponds to "0".

It is then judged whether the flash unit B is mounted at step #426. When the flash unit B is not mounted, it is judged whether the built-in flash unit 4 has popped up (#427). When the flash unit B is not in the pop-up position, the built-in flash unit 4 is made to pop up by means of the flash unit drive section 28 (#428), and the charge condition of the main capacitor is detected in "charge completion check 1" as described hereinafter. When the charge of the main capacitor is not sufficient, a charging operation of the main capacitor is carried out (#429). Then the shutter speed TV and the aperture AV are determined by a program line of normal photographing with a flash unit (#430), and the processing returns. When the flash unit B is mounted at step #426 or when the flash unit 4 is in the pop-up position at step #427, the processing proceeds directly to step #429. It is noted that the program line of normal photographing with a flash unit has a fixed shutter speed of 1/250 and the aperture is made to change according to the brightness of the object.

When FMOD=1, i.e., when the wireless flash mode is selected, the aforesaid "flash communication" is carried out (#431), and it is judged whether the flash unit B is mounted (#432). When the flash unit B is mounted, the processing proceeds to step #422 to carry out the same operation as normal photographing with a flash unit. When the flash unit B is not mounted, the flash flag FF is changed to "1" (#433) and whether the built-in flash 4 is popped up or not is judged. When the built-in flash 4 is not popped up, the flash is made to pop up (#435), and the processing proceeds to "charge completion check 1" to check the voltage across of the main capacitor (#436). Then the shutter speed TV and the aperture AV are determined in the program line of photographing with a wireless flash unit (#437). When the flash 4 is in the pop-up position at step #434, the processing proceeds directly to step #436. In the program line of photographing with a wireless flash unit, the shutter speed is determined according to the synchronized shutter speed input through "flash communication", while the aperture is determined according to the brightness of the object.

Then it is judged whether the data of the distance to the object obtained at the stage of focusing the phototaking lens is not greater than 1 meter (#438). When the distance is greater than 1 meter, the processing proceeds to step #441. When the distance is not greater than 1 meter, the aperture AV determined at step #437 is stopped down by one step (#439) and the shutter speed TV is lowered by one step (#440), after which the processing proceeds to step #441. At step #441, the shutter speed TV determined at step #437 or the shutter speed TV increased at step #440 are compared with the limitative handshake shutter speed TVH. When the shutter speed TV is faster than the limitative hand-shake shutter speed TVH, the processing returns. When the speed TV is slower than the speed TVH, a handshake warning is issued at the display section 23 (#442), and the processing returns. It is noted that the limitative hand-shake shutter speed TVH is the slowest shutter speed tolerant of hand shake in a normal photographing manner, the speed being normally set at the reciprocal of the focal length (millimeters) of the lens.

Figure 20:
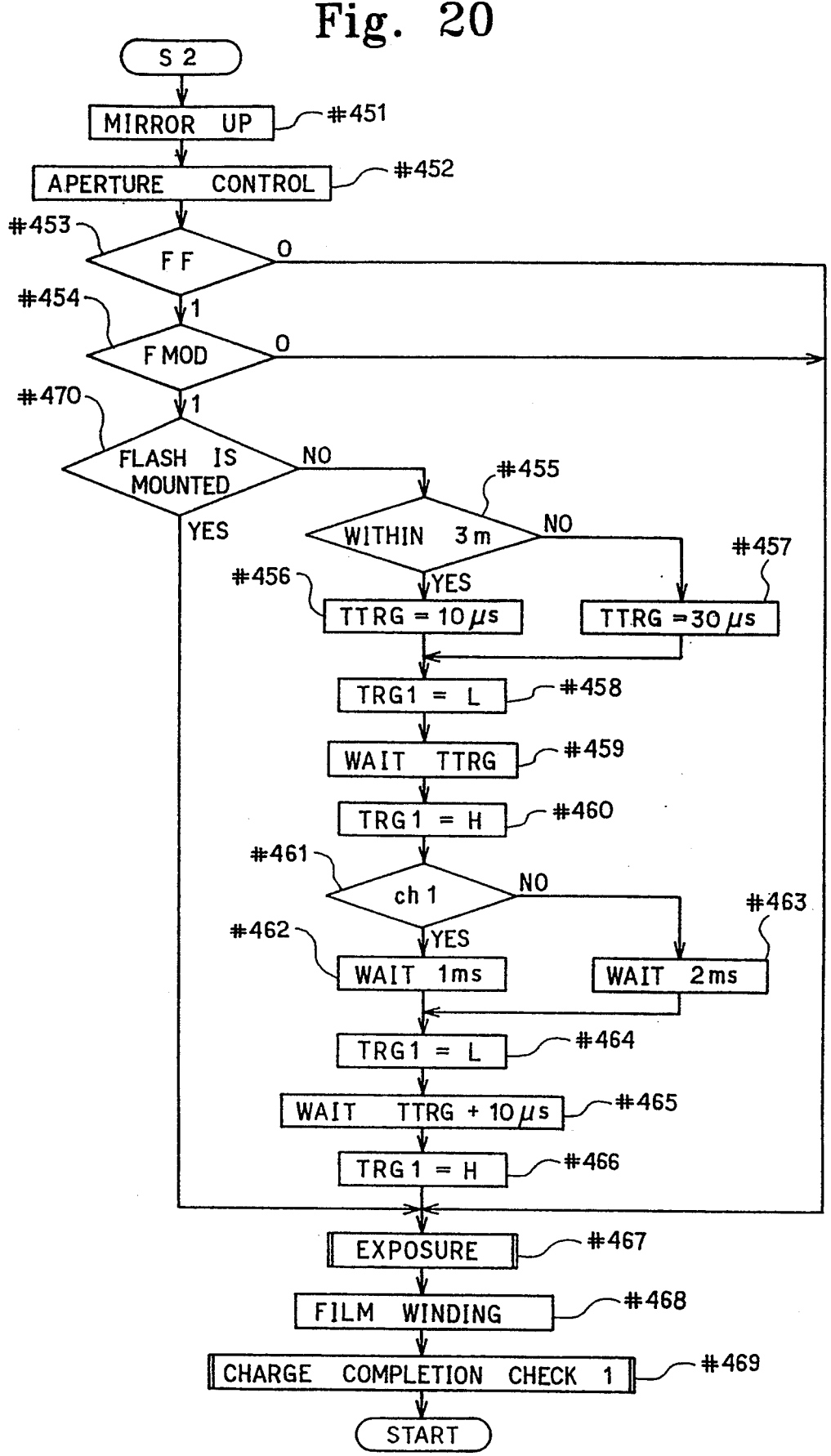

The following describes the processing in the routine "S2" for carrying out aforesaid exposure and film advancing with reference to FIG. 20. Firstly a mirror is moved up (#451), and the aperture diaphragm is driven to set the aperture AV to the value determined as described hereinbefore (#452). Then it is determined that a flash unit is to be used according to the flash flag FF (#453). When no flash unit is to be used (FF=0), the processing proceeds to step #467. When a flash unit is to be used (FF=1), it is determined whether the normal flash mode or the wireless flash mode is selected (#454). When the normal flash mode is selected (FMOD=0), the processing proceeds to step #467. When the wireless flash mode is selected (FMOD=1), the processing proceeds to step #470. At step #470, it is judged whether a flash unit is mounted. When a flash unit is mounted, the processing proceeds to step #467. When no flash is mounted, the processing proceeds to step #455, and it is judged whether the aforesaid distance to the object is greater or not greater than 3 meters. When the distance is not greater than 3 meters, a trigger time TTRG is set to 10 microseconds (#456), while it is greater than 3 meters, TTRG is set to 30 microseconds (#457), and the processing proceeds to step #458. It is noted that the trigger time TTRG represents the flashing time of the built-in flash unit 4 to transmit a wireless signal of such as discrimination signals, etc. to the flash unit B.

At steps #458, #459, and #460, the signal status at the terminal TRG1 is changed to "L" to operate a flashlight during the trigger time TTRG set up as described above. After waiting for 1 millisecond when the channel "1" is selected or 2 milliseconds when the channel "2" is selected (#461, #462, and #463), the signal status at the terminal TRG1 is changed to "L" for the trigger time TTRG plus 10 microseconds (#464, #465, and #466), and the processing proceeds to step #467. At step #467, an exposure operation is carried out according to a flow chart of "exposure" as described hereinafter. After completing an exposure operation, the film is advanced by 1 frame by means of a film feed means (not shown) (#468). Then the charge condition of the main capacitor is checked according to "charge completion check 1" (#469), and the processing returns to "START".

Figure 21:
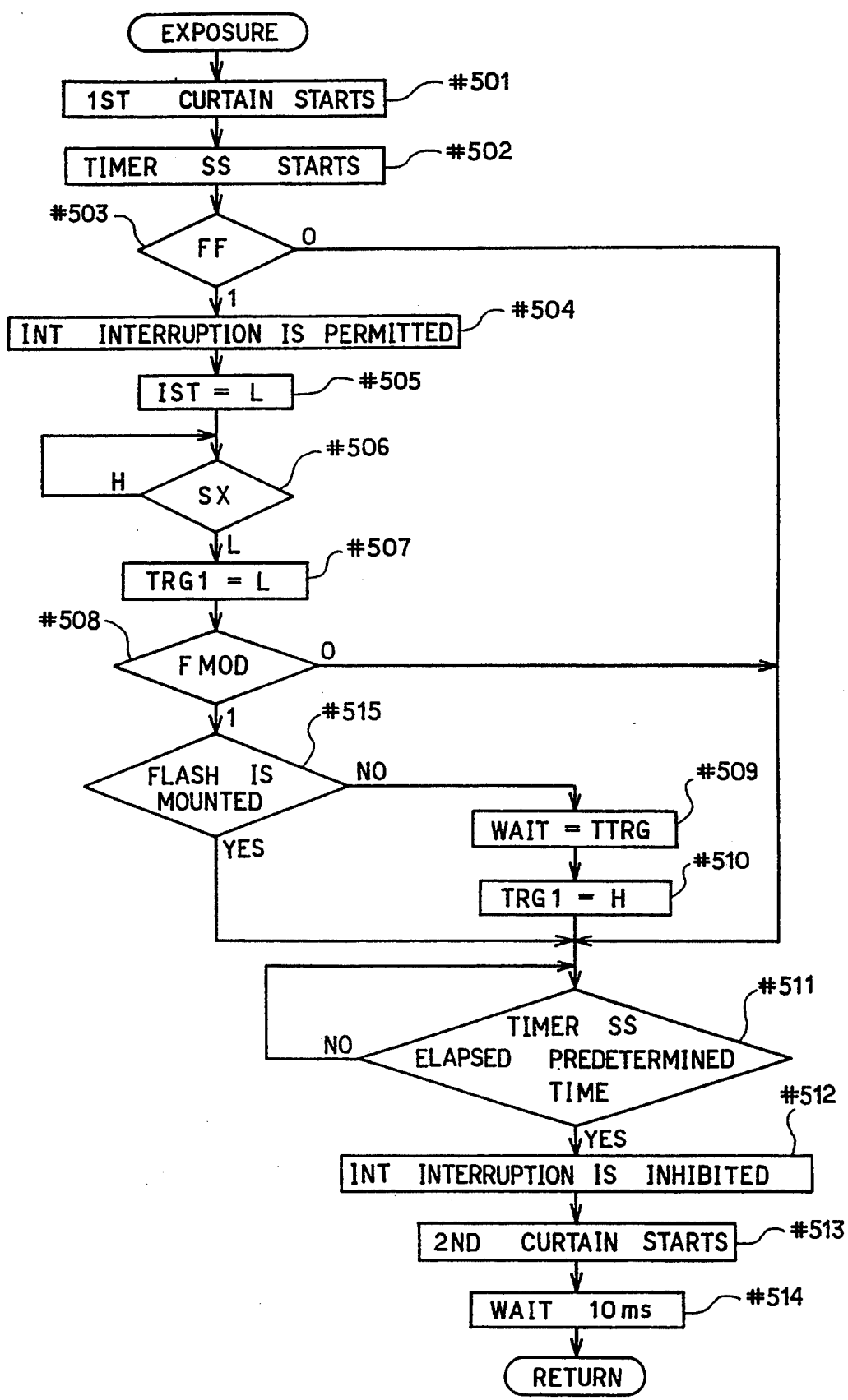
FIG. 21 is a flow chart of the operations of "exposure".

The following describes the exposure operations with reference to the flow chart of "exposure" in FIG. 21. Firstly the first curtain is made to run (#501) and a timer SS for measuring the shutter speed is made to start (#502). Then it is judged whether a flash unit is to be used at the exposure time according to the flash flag FF (#503). When no flash unit is used, the processing proceeds to step #511. When a flash unit is used, an interruption from the terminal INT of the integration circuit 29 is permitted (#504), and the integration circuit 29 is made to start its operation (terminal IST="L") (#505) to wait for completion of the first curtain run (terminal SX="L") (#506). When the first curtain run completes, the signal status at the terminal TRG1 is changed to "L" to start a flashing operation (#507). Then the mode flag FMOD is subject to a discrimination (#508). When the normal flash mode is selected (FMOD=0), the processing proceeds to step #511. When the wireless flash mode is selected (FMOD=1), it is judged whether a flash unit is mounted (#515). When a flash unit is mounted, the processing proceeds to step #511. When no flash unit is mounted, the processing proceeds to step #509. After waiting for the elapse of the trigger time TTRG (#509), the signal status at TRG1 is changed to "H" (#510) with which signal the flash unit B starts an intermittent flashing operation in the wireless flash mode. At step #511, after waiting for the elapse of the timer SS by the time corresponding to the aforesaid shutter speed TV, any interruption from the terminal INT is inhibited (#512) and the second curtain is made to run (#523). After waiting for 10 milliseconds which is enough for the completion of the second curtain run (#514), and the processing returns.

Figure 22:
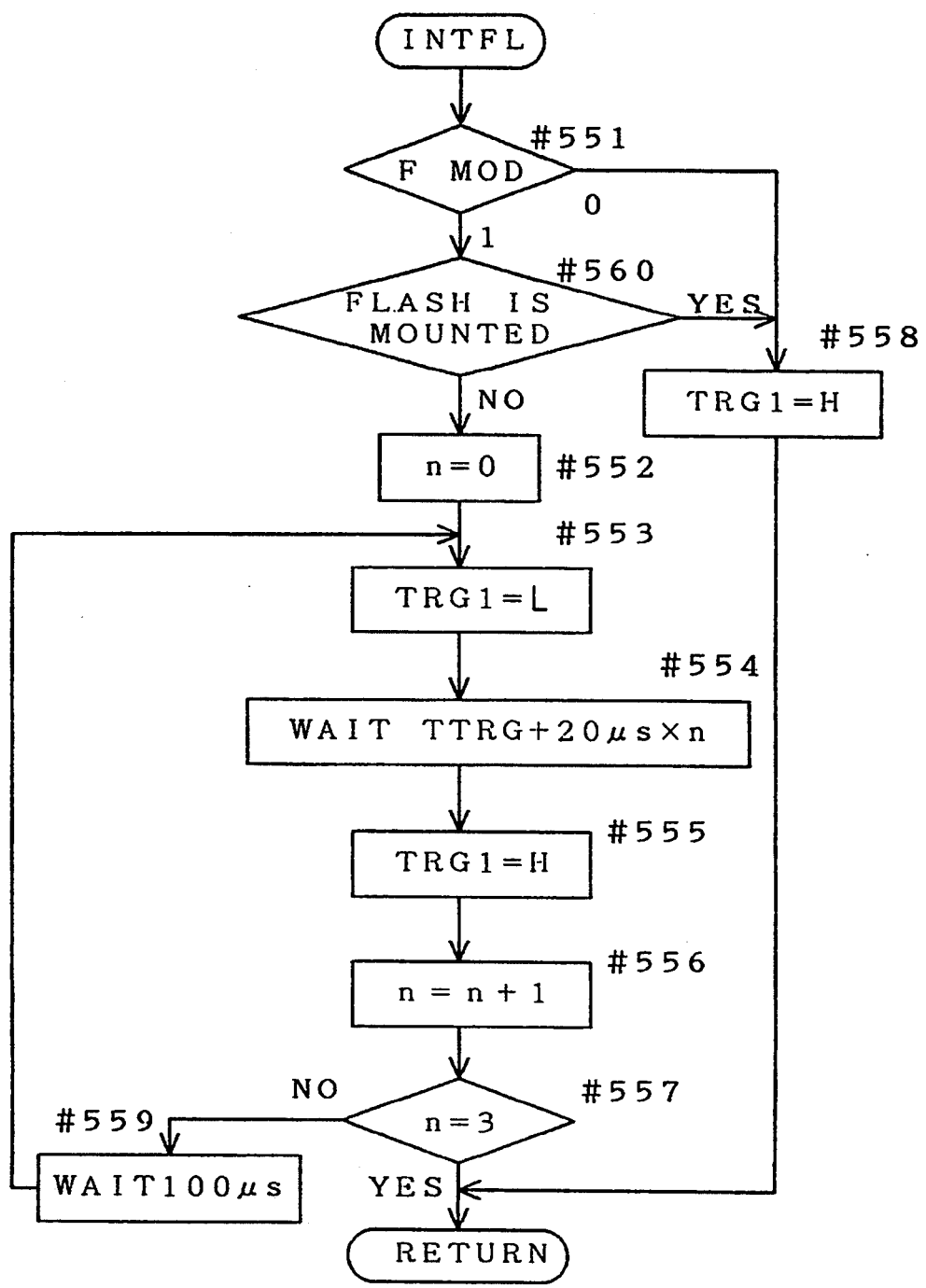
FIG. 22 is a flow chart of the operations of interruption processing routine of "INTFL".

FIG. 22 shows an interruption routine "INTFL" for forming a stop signal light output when an interruption takes place from the terminal INT of the integration circuit 29 at the time of exposure with use of a flash unit. Referring to the routine, when an interruption takes place, firstly the flash mode is discriminated according to the mode flag FMOD (#551). When the normal flash mode is selected (FMOD=0), the signal status at the terminal TRG1 is changed to "H" to stop the flashing operation (#558), and the processing returns. When the wireless flash mode is selected (FMOD=1), it is discriminated whether a flash unit is mounted (#560). When a flash unit is mounted, the processing proceeds to step #558. When no flash unit is mounted, a counter value n is set to "0" (#552), and the processing proceeds to step #553. The counter value n is to control the number of the flashing stop signals to the flash unit B. At step #553, the signal status at the terminal TRG1 is changed to "L", and after waiting for the trigger time TTRG+20×n microseconds (#554), the signal status at the terminal is changed to "H" (#555). Then the counter value n is changed to n+1 (#556), and it is checked whether the counter value n is changed to 3 (#557). When the counter value n is not changed to 3, after waiting for 100 microseconds (#559), the processing returns to step #553 to repeat the same operations. When the counter n becomes 3 at step #557, the processing returns. Therefore, the signal status at the terminal TRG1 is changed from "L" to "H" three times to output the stop signal three times, which means that the flashing duration is increased according as the flashing frequency increases.

As described above, the flashing stop signal to the flash unit B is output a plurality of times (three times in the present embodiment) in the wireless flash mode. The above is because there is no synchronization between the intermittent flashing time of the flash unit B and the stop signal output timing of the camera A, and therefore with only one-time output of the stop signal the flash unit B sometimes fails to detect the stop signal due to the fact that the stop signal may concur with the flashing of the flash unit B. Although the above-mentioned problem is solved by outputting the stop signal a plurality of times in the present embodiment, it may be possible to output the stop signal when the flash unit B is not flashing according to a data of the flashing timing may be memorized in the camera A before photographing. The flashing timing data may be written in a ROM of the camera A, or it may be transmitted from the flash unit B to the camera A through a communication between the flash unit B and the camera A. It is also acceptable to provide the same light receiving sections as that of the flash unit B to the camera A and detect the time when the flash unit B is not flashing to output the stop signal according to the detected time. With the above-mentioned construction, the flashing operation of the flash unit B can be securely stopped merely by outputting the stop signal once.

Figure 25:
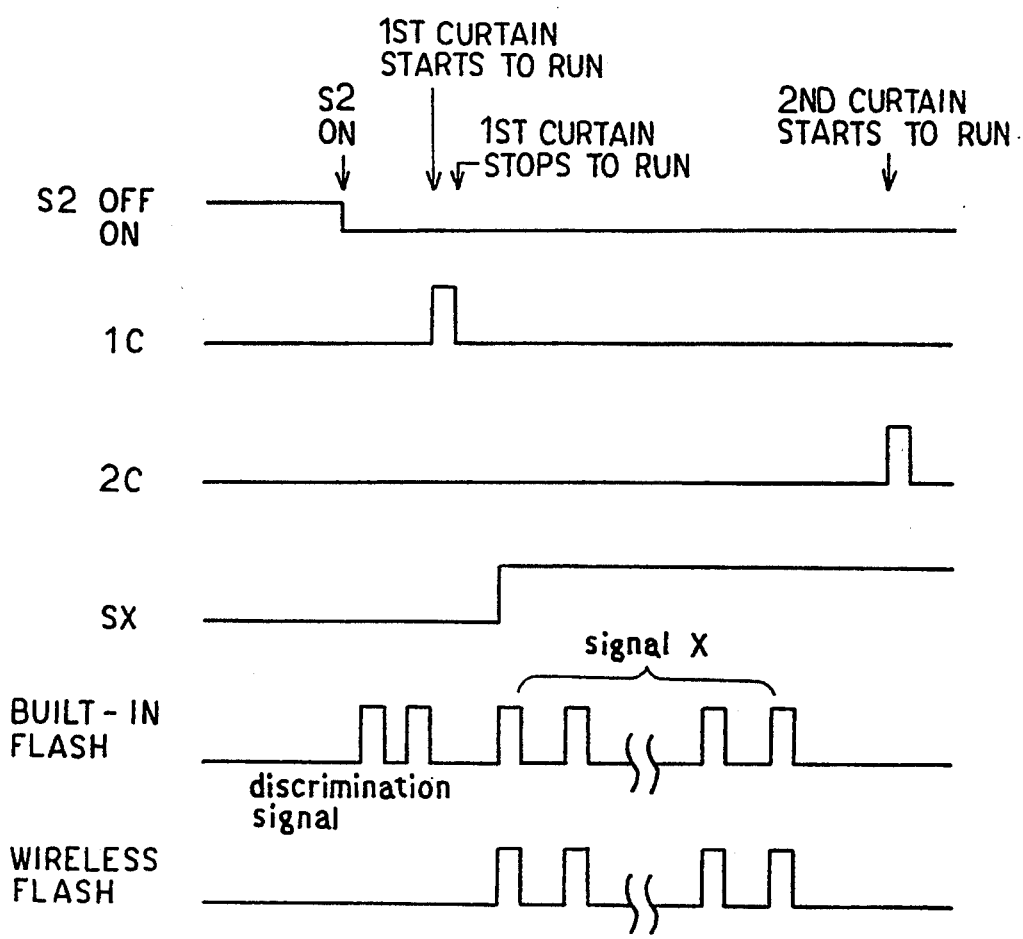
FIG. 25 is a timing chart in the test flashing mode in accordance with another embodiment.

Although the flashing operation is made to start with the signal X after the discrimination signal is output in the present embodiment, the flashing operation may be also made to start after the elapse of a specified interval from the time of outputting the discrimination signal. The above-mentioned specified interval is a time enough for the first curtain to run completely from the start position to the end position (10 milliseconds in the present embodiment). With the abovementioned time arrangement, the signal X is not necessary to start a flashing operation. Although the flash unit B starts its intermittent flashing operation according to the signal X for starting a flashing operation while the camera A carries out an integration of light reflected on the object and outputs a stop signal when the integration amount reaches a specified value in the present embodiment, the flash unit B may be made to flash once based on the aforesaid flashing frequency-flashing duration data every time the signal X is output, and the camera A may be made to continue outputting the signal X until the light reflected on the object reaches a specified value. By adopting the above-mentioned arrangement, no stop signal is necessary, and the timing wherein corresponds to a timing chart shown in FIG. 25.

Figure 23:
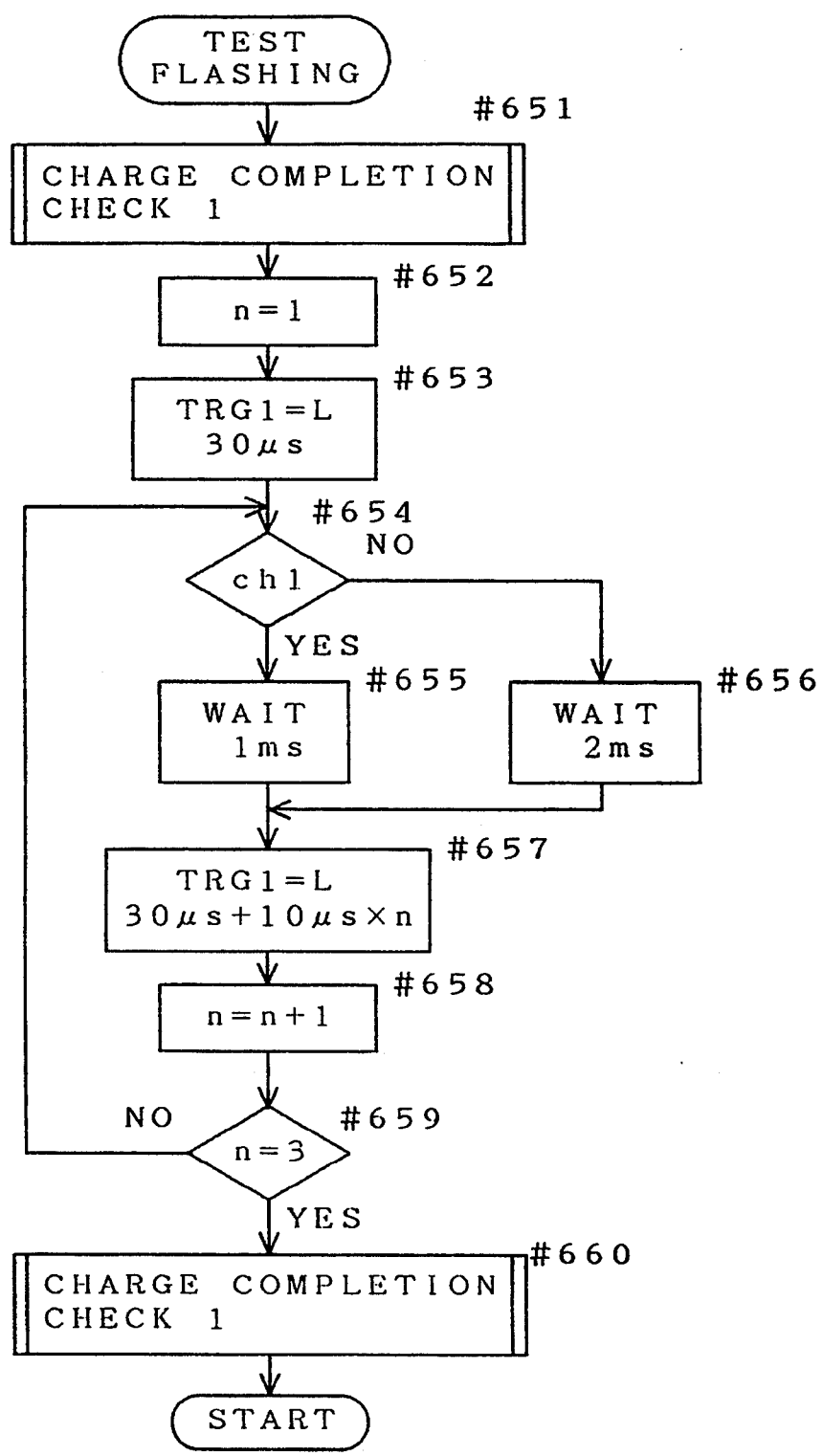
FIG. 23 is a flow chart of the routine of "test flashing" for transmitting a signal light for carrying out a test flashing.

FIG. 23 is a routine of "test flashing" to output a signal for carrying out a test flashing in the wireless flash mode. Describing the above-mentioned routine in detail, firstly the charge condition of the main capacitor is detected according to "charge completion check 1" (#651). Then the counter value n is set to 1 (#652), and the signal status at the terminal TRG1 is changed to "L" for 30 microsecond to carry out a flashing operation (#653). Then the selected channel is discriminated (#654). After waiting 1 millisecond when the channel 1 is selected or 2 milliseconds when the channel 2 is selected (#655 and #656), the signal status at the terminal TRG1 is changed to "L" to carry out a flashing operation during the time of 30 microseconds+10×n microseconds (#657), and then the counter value n is changed to n+1 (#658) to thereafter check whether the counter value n is changed to 3 (#659). Until the counter value n becomes 3, the routine operation at steps #654 through #658 are repeated. When the flashing signal is output three times and the counter value n becomes 3, the processing proceeds to step #660 to execute "charge completion check 1" and then to "START". It is noted that, when the camera A is carrying a distance data of the object at the time the test flashing command signal is output, the flashing duration may be changed according to the distance to the object in the same manner as the discrimination signal is transmitted.

Figure 24:
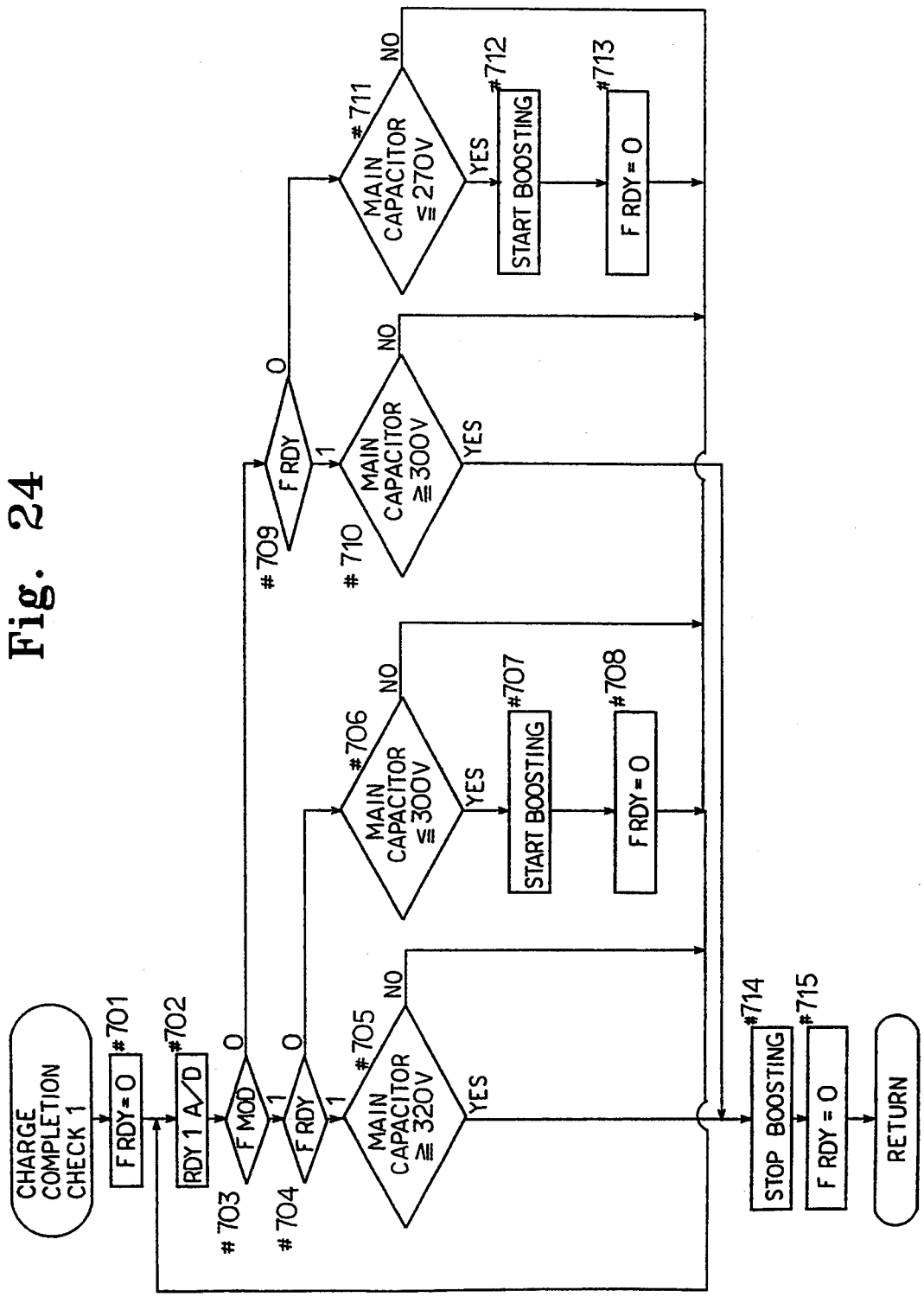
FIG. 24 is a flow chart of the routine of "charge completion check 1".

FIG. 24 is the routine of "charge completion 1" for checking the charge condition and controlling charging of the main capacitor for the built-in flash 4 of the camera A. Describing the above-mentioned routine in detail, firstly the charge flag FRDY is set to "0" (#701). The charge flag FRDY is a flag for discriminating whether a charging operation is currently carried out. The flag assumes "1" in charging time or "0" in any other case. Then the information of charging the main capacitor is read by converting the output at the terminal RDY1 to an analog-to-digital (#702). Then the flash mode is discriminated by means of the mode flag FMOD (#703). When the wireless flash mode is not selected (FMOD=0), the processing proceeds to step #709. When the wireless flash mode is selected (FMOD=1), it is discriminated whether a charging operation is currently carried out by means of the charge flag FRDY (#704). When charging is not carried out (FRDY=0), the processing proceeds to step #706. When charging is carried out (FRDY=1), it is judged whether the voltage across the main capacitor is not lower than 320 volt based on the analog-to digital converted output (#705). When the voltage across the main capacitor has not yet reached 320 volt, the processing returns to step #702. When the voltage is not lower than 320 volt, the boosting operation stops (#714), and the charge flag FRDY is changed to "0" (#715), after which the processing returns. At step #706, it is judged whether the voltage across the main capacitor is higher than 300 volt. When the voltage is higher than 300 volt, the processing returns to step #702. When the voltage is not higher than 300 volt, a boosting operation starts (#707), and the charge flag FRDY is changed to "0" (#708) after which the processing returns to step #702. Regarding the processing at steps #709 through #713, the same operation as described above are carried out except that the voltage across the main capacitor is changed from the range of 320 volt to 300 volt to the range of 300 volt to 270 volt in comparison with the wireless flash mode, and therefore no description is provided herein.

Although the aperture is stopped down or the flashing duration is shortened when the object is located close to the camera as shown in FIGS. 19 and 20 in order to reduce the possible influence of the built-in flash 4 on the exposure operation as far as possible, there may be incorporated information of film sensitivity, etc.

In the present embodiment, photographing with use of the wireless flash unit B, the built-in flash 4 of the camera is used only for transmitting signal light to the flash unit B to reduce the influence on the exposure to the film as far as possible, with which the exposure to the object is shared largely by the flash unit B. However, as described above, the integration circuit 29 of the present embodiment is capable of setting up an integration level. Therefore, for example, by setting the integration level to two thirds of the proper exposure amount to operate a wireless flash, setting the integration level to one third of the proper exposure amount according to transmission of the stop signal, and making the built-in flash 4 continue to flash until INT becomes INT="L", a photograph exhibiting a three-dimensional impression and light shadow can be obtained. By appropriately varying the aforesaid integration level, the degree of the flash unit B and the built-in flash 4 in contribution to exposure can be varied. When no proper exposure amount can be obtained through flashing the flash unit B in full times, an underexposed photograph results. In such a case, the built-in flash 4 may flash until INT becomes INT="L" to make up for the underexposure.

Although the built-in flash 4 is designed to automatically pop up when it is retracted at the time of photographing in the wireless flash mode in the present embodiment, an alarm for instructing the operator to make the built-in flash 4 to pop up in the case of a camera where the built-in flash is designed to be manually popped up.

Although a test flashing of the flash unit B is permitted by operating the test flashing button 3 in the wireless flash mode in the present embodiment, the flash unit B may be constructed to a test flashing at the terminal X when the test flashing button S is operated in the condition that the flash unit B is mounted to the camera A. The above arrangement enables a test flashing operation when the flash unit B has no test flashing button. When the flash unit B is not mounted in the normal flash mode, the built-in flash 4 may be subject to a test flashing operation.

It is noted that the discrimination signal communicated between the camera A and the flash unit B is not limited to light, and for example, infrared ray or ultrasonic waves may be used instead.

Also, in the above-mentioned embodiment, the camera system is constructed to operate as a normal flash unit when the flash unit B is mounted to the camera A, however, the system may be designed that the flash unit B operates the same as the built-in flash unit 4 in the wireless flash mode so that it can control other wireless flashes.

What is claimed is:

1. A camera system capable of wireless flash photographing, comprising:
    an external flash unit including transmit means for transmitting discriminating data to a camera;
    a camera, which is associated with the external flash unit, including receiving means for receiving the discriminating data transmitted from the external flash unit;
    storing means provided in said camera for storing the received discriminating data; and
    controlling means provided in said camera for controlling said external flash unit in accordance with the stored data in said storing means in a condition where said external flash unit is detached from said camera.

2. A camera system capable of wireless flash photographing as claimed in claim 1, wherein said external flash unit further includes memory means for storing the discriminating data which indicates a characteristic of the external flash unit.

3. A camera system capable of wireless flash photographing as claimed in claim 1, wherein said controlling means further controls operations of the camera in response to the received discriminating data.

4. A camera system capable of wireless flash photographing as claimed in claim 1, wherein transmission by the transmit means is carried out when the external flash unit is attached to the camera.

5. A camera system capable of wireless flash photographing as claimed in claim 1, wherein said discriminating data is synchronized shutter speed data in photographing with use of the external flash unit.

6. A camera system capable of wireless flash photographing as claimed in claim 1, wherein said discriminating data is channel data.

7. A camera system capable of wireless flash photographing, comprising:
    a camera including transmit means for transmitting a first signal which is produced in relation to a photographing operation and a second signal which is produced in no relation to a photographing operation; and
    an external flash unit, which is associated with the camera, including:
        receiving means for receiving the signals and for outputting a starting signal;
        timer means for measuring predetermined time by receiving the starting signal; and
        flash controlling means for controlling a flash so as to flash upon the reception of said first signal and to flash after the timer means counts the predetermined time after the reception of said second signal.

8. A flash unit which is used for a camera system capable of wireless flash photographing, comprising:
    receiving means for receiving a specified signal transmitted from a camera thereby outputting a starting signal;
    timer means for measuring a predetermined time by receiving the starting signal; and
    flash controlling means for controlling a flash so as to flash upon the reception of a signal which is produced in relation to a photographing operation and to flash after the timer means counts the predetermined time after the reception of a signal which is produced in no relation to a photographing operation.

9. A camera system capable of wireless flash photographing, comprising:
a camera including setting means for setting up a first or a second channel, indicating means for indicating test flashing without release, and transmit means for transmitting a first signal when the first channel is set up and a second signal when the second channel is set up, respectively, in response to an indication of the test flashing; and
an external flash unit which is associated with the camera, including;
setting means for setting up the first or the second channel;
receiving means for receiving a signal and for outputting a second starting signal either when the first signal is received in setting up the first channel or the second signal is received in setting up the second channel; and
flash controlling means for controlling a flash so as to flash in response to the input of the second starting signal.

10. A camera system capable of wireless flash photographing as claimed in claim 9, wherein said camera further includes release means for carrying out a release operation.

11. A camera system capable of wireless flash photographing as claimed in claim 9, wherein the transmit means transmits a third signal when the first channel is set up and a fourth signal when the second channel is set up, respectively, in response to a release operation.

12. A camera system capable of wireless flash photographing as claimed in claim 9, wherein the receiving means outputs a first starting signal either when the first signal is received in setting up the first channel or when the second signal is received in setting up the second channel.

13. A flash unit which is used for a camera system capable of wireless flash photographing, comprising:
setting means for setting up a first or a second channel;
receiving means for receiving third and fourth signals transmitted from a camera and for outputting a second starting signal either when the third signal is received in setting up the first channel or the fourth signal is received in setting up the second channel; and
flash controlling means for controlling a flash so as to flash in response to the input of the second starting signal.

14. A camera system capable of wireless flash photographing, comprising:
a camera including first flashing means for emitting a first flash light to transmit a specified signal, determining means for determining that the camera is under a predetermined condition, and changing means for changing an amount of light emitted by the first flashing means; and
an external flash unit, which is associated with the camera, including;
second flashing means for emitting light on an object;
light-receiving means for receiving the specified signal; and
second control means for controlling the second flashing means in response to the received signal, wherein said changing means decreases the amount of light emitted by the first flashing means when the determining means determines that the camera is under the predetermined condition.

15. A camera system capable of wireless flash photographing, comprising:
a camera including outputting means for outputting a signal to start a release operation, exposure means for carrying out an exposure operation, means for sending a light emission start signal in a wireless manner, means for producing specified signals, transmit means for transmitting the specified signals, and control means for controlling the transmit means so as to transmit at least one of said specified signals after the signal to start release operation is outputted by the exposure operation starts;
an external flash unit, which is associated with the camera, including;
receiving means for receiving said specified signals; and
second control means for controlling the flash so as to start the predetermined operation based on a received specified signal.

16. A camera system as claimed in claim 14, wherein the predetermined condition is the fact that a sensitivity of a film is over a prescribed value.

17. A camera system as claimed in claim 14, wherein the predetermined condition is the fact that an object distance is under a prescribed value.

18. A camera system as claimed in claim 15, wherein said specified signal is light emitted by said transmit means.

19. A camera system as claimed in claim 15, wherein said control means inhibits said transmit means from transmitting the signal during a travelling of a leading shutter curtain.

20. A flash unit capable of wireless flash photographing, comprising:
mode selecting means for selecting either a normal flash photographing mode wherein flashing is controlled by a control signal through a signal line from a camera when the flash unit is connected with the camera, or a wireless flash mode wherein flashing is controlled through a wireless control signal when the flash unit is not connected with the camera;
detecting means for detecting that the flash unit is mounted to the camera; and
control means for controlling a flash so as to carry out an operation of the normal flash photographing mode when the flash is mounted to the camera, even if the wireless flash mode is selected.

21. A flash unit which is used with a camera and is capable of wireless photographing, comprising:
an illuminating section for illuminating an object;
illuminating angle changing means capable of changing an illuminating angle by the illuminating section;
mode setting means for setting up either a normal flash photographing mode or a wireless flash photographing mode; and
control means for controlling the illuminating angle changing means so as to make the illuminating angle wider in the wireless flash photographing mode so that an angle of view of the camera is illuminated by said illuminating section.

* * * * *